(12) United States Patent
Murata et al.

(10) Patent No.: US 12,117,679 B2
(45) Date of Patent: Oct. 15, 2024

(54) LIQUID CRYSTAL DISPLAY DEVICE

(71) Applicant: Sharp Display Technology Corporation, Kameyama (JP)

(72) Inventors: Koji Murata, Kameyama (JP); Hiroshi Tsuchiya, Kameyama (JP); Shinpei Higashida, Kameyama (JP); Takahiro Sasaki, Kameyama (JP); Takashi Satoh, Kameyama (JP); Shinji Shimada, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/097,171

(22) Filed: Jan. 13, 2023

(65) Prior Publication Data

US 2023/0236448 A1    Jul. 27, 2023

(30) Foreign Application Priority Data

Jan. 21, 2022  (JP) ................. 2022-008012

(51) Int. Cl.
*G02F 1/13* (2006.01)
*F21V 8/00* (2006.01)
(Continued)

(52) U.S. Cl.
CPC ......... *G02F 1/1323* (2013.01); *G02B 6/0038* (2013.01); *G02F 1/133512* (2013.01); *G02F 1/133514* (2013.01); *G02F 1/134336* (2013.01); *G02F 1/134345* (2021.01); *G02F 1/13439* (2013.01); *G02F 1/136286* (2013.01); *G02F 1/137* (2013.01); *G02B 2207/123* (2013.01)

(58) Field of Classification Search
None
See application file for complete search history.

(56) References Cited

U.S. PATENT DOCUMENTS

2002/0018341 A1   2/2002  Torihara et al.
2007/0085958 A1*  4/2007  Lin ................... G02F 1/134363
                                                                349/141
(Continued)

FOREIGN PATENT DOCUMENTS

CN    109298571 B  *  7/2021  .......... G02F 1/1323
JP    2002124112 A     4/2002
JP    2021067852 A     4/2021

*Primary Examiner* — Shan Liu
(74) *Attorney, Agent, or Firm* — ScienBiziP, P.C.

(57) ABSTRACT

Provided is a liquid crystal display device that can switch between the privacy mode and the public mode and achieve a high contrast ratio even during display in the privacy mode. The liquid crystal display panel includes: a liquid crystal panel; and a control circuit. The active matrix substrate sequentially includes a first substrate, a first electrode, a first insulating layer, and second electrodes each including a first linear electrode. The color filter substrate includes a second substrate, a black matrix, a color filter layer, a third electrode, and a fourth electrode which is disposed between the black matrix and the third electrode and to which constant voltage is applied. The third electrode includes second linear electrodes and overlaps a portion of the black matrix in a plan view. The control circuit switches between application of driving voltage and application of constant voltage to the third electrode.

12 Claims, 25 Drawing Sheets

(51) Int. Cl.
*G02F 1/1335* (2006.01)
*G02F 1/1343* (2006.01)
*G02F 1/1362* (2006.01)
*G02F 1/137* (2006.01)

(56) References Cited

U.S. PATENT DOCUMENTS

| | | | |
|---|---|---|---|
| 2013/0010237 A1* | 1/2013 | Fujiyama | G02F 1/134309 349/103 |
| 2014/0340621 A1* | 11/2014 | Chung | G02F 1/133514 349/106 |
| 2017/0059898 A1 | 3/2017 | Su et al. | |
| 2017/0192263 A1* | 7/2017 | Jiang | G02F 1/1323 |
| 2020/0249504 A1* | 8/2020 | Hopkin | G09G 3/3426 |
| 2021/0124223 A1 | 4/2021 | Murata et al. | |
| 2021/0149511 A1* | 5/2021 | Chung | G06F 3/0416 |
| 2021/0405404 A1* | 12/2021 | Chang | G09G 5/10 |

\* cited by examiner

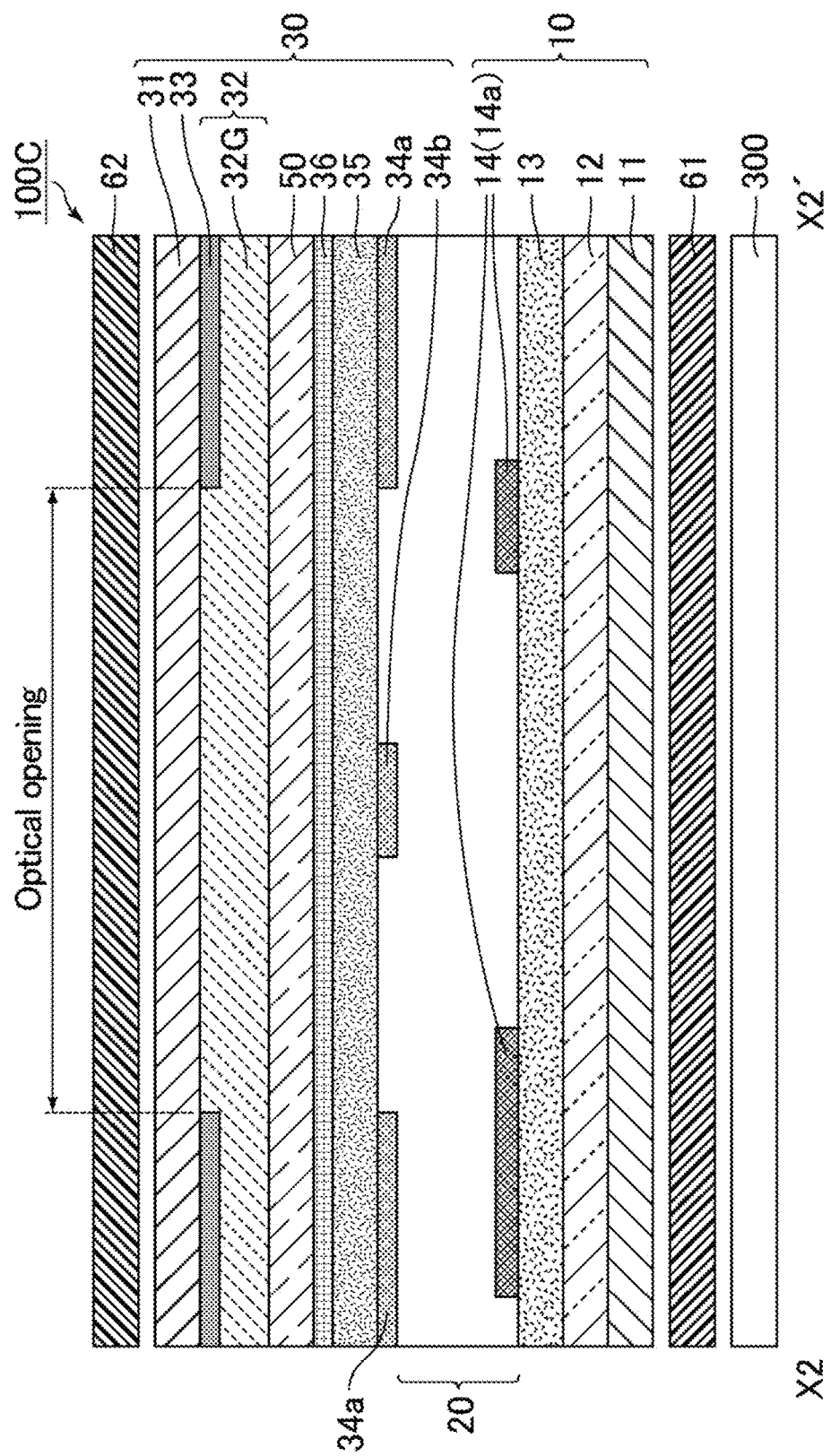

LIQUID CRYSTAL DISPLAY DEVICE

CROSS-REFERENCE TO RELATED APPLICATIONS

The present application claims priority under 35 U.S.C. § 119 to Japanese Patent Application No. 2022-008012 filed on Jan. 21, 2022, the contents of which are incorporated herein by reference in their entirety.

BACKGROUND OF THE INVENTION

Field of the Invention

The present disclosure relates to liquid crystal display devices.

Description of Related Art

Liquid crystal display devices are display devices utilizing a liquid crystal composition to display images. In a typical display mode thereof, voltage is applied to a liquid crystal composition sealed between paired substrates such that the alignment of liquid crystal molecules in the liquid crystal composition is changed according to the applied voltage, whereby the amount of light passing through the device is controlled. Such liquid crystal display devices have advantageous features such as thin profile, light weight, and low power consumption, and are therefore used in a variety of fields.

Studies to enhance the viewing angle characteristics of liquid crystal display devices have been made such that the same image can be observed regardless of whether the angle of observation is in a narrow viewing angle range or a wide viewing angle range. Meanwhile, a display method considered in terms of privacy protection is one that allows observation of an image in a narrow viewing angle range but makes the image difficult to observe in a wide viewing angle range outside the narrow viewing angle range. For example, JP 2021-67852 A discloses a liquid crystal display device capable of switching between the narrow viewing angle mode and the wide viewing angle mode by controlling the voltage applied to the third electrode in the color filter substrate.

US 2017/0059898 A1 discloses a liquid crystal display device including a first substrate provided with a first electrode and a first alignment film thereon; a liquid crystal layer; and a second substrate provided with a second electrode, a third electrode, and a second alignment film thereon, wherein the viewing angle is switchable by applying voltage to the first electrode.

BRIEF SUMMARY OF THE INVENTION

The present inventors found in their studies that applying voltage to an electrode in a color filter substrate with a black matrix sometimes caused light leakage in the privacy mode (narrow viewing angle mode) and a decrease in front contrast ratio. As a result of examining the cause of the light leakage, the inventors found that applying voltage to an electrode in a color filter substrate sometimes charges the black matrix and forms an undesirable electric field in the liquid crystal layer, which may cause light leakage and a decrease in front contrast ratio in the privacy mode.

The liquid crystal display device disclosed in US 2017/0059898 A1 includes a planar solid electrode as the first electrode of the counter substrate. With this configuration, applying voltage to the first electrode always generates a vertical electric field in the entire liquid crystal panel. A high front contrast ratio is thus difficult to achieve with this device.

In response to the above issues, an object of the present invention is to provide a liquid crystal display device capable of switching between the privacy mode and the public mode and achieving a high contrast ratio during display in the privacy mode.

(1) One embodiment of the present invention is directed to a liquid crystal display device including: a liquid crystal panel provided with sub-pixels arranged in a matrix pattern; and a control circuit, the liquid crystal panel sequentially including an active matrix substrate, a liquid crystal layer, and a color filter substrate, the active matrix substrate sequentially including a first substrate, a first electrode, a first insulating layer, and second electrodes arranged in the respective sub-pixels and including a first linear electrode extending in a first direction, the color filter substrate including a second substrate, a black matrix lying between the sub-pixels, a color filter layer, a third electrode, and a fourth electrode which is disposed between the black matrix and the third electrode and to which constant voltage is applied, the third electrode including second linear electrodes extending in a second direction that intersects the first direction, the third electrode overlapping a portion of the black matrix in a plan view, the control circuit configured to switch between application of driving voltage and application of constant voltage to the third electrode.

(2) In an embodiment of the present invention, the liquid crystal display device includes the structure (1), and in a plan view, the third electrode includes a third linear electrode extending in the second direction and overlapping an optical opening in one of the sub-pixels.

(3) In an embodiment of the present invention, the liquid crystal display device includes the structure (2), and the fourth electrode overlaps the third linear electrode in the optical opening in the sub-pixel.

(4) In an embodiment of the present invention, the liquid crystal display device includes the structure (2), and the fourth electrode is provided with an opening positioned to overlap the third linear electrode in a plan view.

(5) In an embodiment of the present invention, the liquid crystal display device includes any of the structures (1) to (4), and the color filter substrate sequentially includes the second substrate, the black matrix, the color filter layer, a first dielectric layer, the fourth electrode, a second dielectric layer, and the third electrode.

(6) In an embodiment of the present invention, the liquid crystal display device includes any of the structures (1) to (4), and the color filter substrate sequentially includes the second substrate, the black matrix, the fourth electrode, the color filter layer, a second dielectric layer, and the third electrode.

(7) In an embodiment of the present invention, the liquid crystal display device includes the structure (5) or (6), and the liquid crystal display device includes a third dielectric layer between the third electrode and the liquid crystal layer.

(8) In an embodiment of the present invention, the liquid crystal display device includes any of the structures (1) to (7), and the third electrode is formed from a transparent conductive material.

(9) In an embodiment of the present invention, the liquid crystal display device includes any of the structures (1) to (8), the active matrix substrate includes a gate line and a source line intersecting the gate line, and the gate line extends in the second direction.

(10) In an embodiment of the present invention, the liquid crystal display device includes the structure (9), and at least part of each of the second linear electrodes overlaps the gate line in a plan view.

(11) In an embodiment of the present invention, the liquid crystal display device includes any of the structures (1) to (10), the control circuit is capable of switching between a first display mode and a second display mode, the first display mode allowing a first image to be observed in a narrow viewing angle range including a direction normal to the liquid crystal panel, the second display mode allowing the first image to be observed in a wide viewing angle range including the narrow viewing angle range, and the control circuit is configured to apply the driving voltage to the third electrode in the first display mode and apply the constant voltage to the third electrode in the second display mode.

(12) In an embodiment of the present invention, the liquid crystal display device includes the structure (11), the liquid crystal display device includes a backlight behind a back surface of the liquid crystal panel, the backlight includes a light source and a shading louver disposed closer to the liquid crystal panel than the light source is, and the control circuit is configured to control the luminance of the backlight to be lower in the first display mode than in the second display mode.

The present invention can provide a liquid crystal display device that can switch between the privacy mode and the public mode and achieve a high contrast ratio even during display in the privacy mode.

BRIEF DESCRIPTION OF THE DRAWINGS

FIG. 6 is a schematic cross-sectional view taken along line X2-X2' in FIG. 5A.

DETAILED DESCRIPTION OF THE INVENTION

Hereinafter, embodiments of the present invention are described. The present invention is not limited to the following embodiments, and the design of the present invention can be modified as appropriate within the range satisfying the configuration of the present invention. Hereinafter, the same reference signs refer to the same portions or the portions having the same function throughout the drawings, and redundant description of already described portions is omitted as appropriate. The modes in the present invention may appropriately be combined within the gist of the present invention.

Embodiment 1

A liquid crystal display device of Embodiment 1 includes: a liquid crystal panel provided with sub-pixels arranged in a matrix pattern; and a control circuit, the liquid crystal panel sequentially including an active matrix substrate, a liquid crystal layer, and a color filter substrate, the active matrix substrate sequentially including a first substrate, a first electrode, a first insulating layer, and second electrodes arranged in the respective sub-pixels and including a first linear electrode extending in a first direction, the color filter substrate including a second substrate, a black matrix lying between the sub-pixels, a color filter layer, a third electrode, and a fourth electrode which is disposed between the black matrix and the third electrode and to which constant voltage is applied, the third electrode including second linear electrodes extending in a second direction that intersects the first direction, the third electrode overlapping a portion of the black matrix in a plan view, the control circuit configured to switch between application of driving voltage and application of constant voltage to the third electrode.

Figure 1:
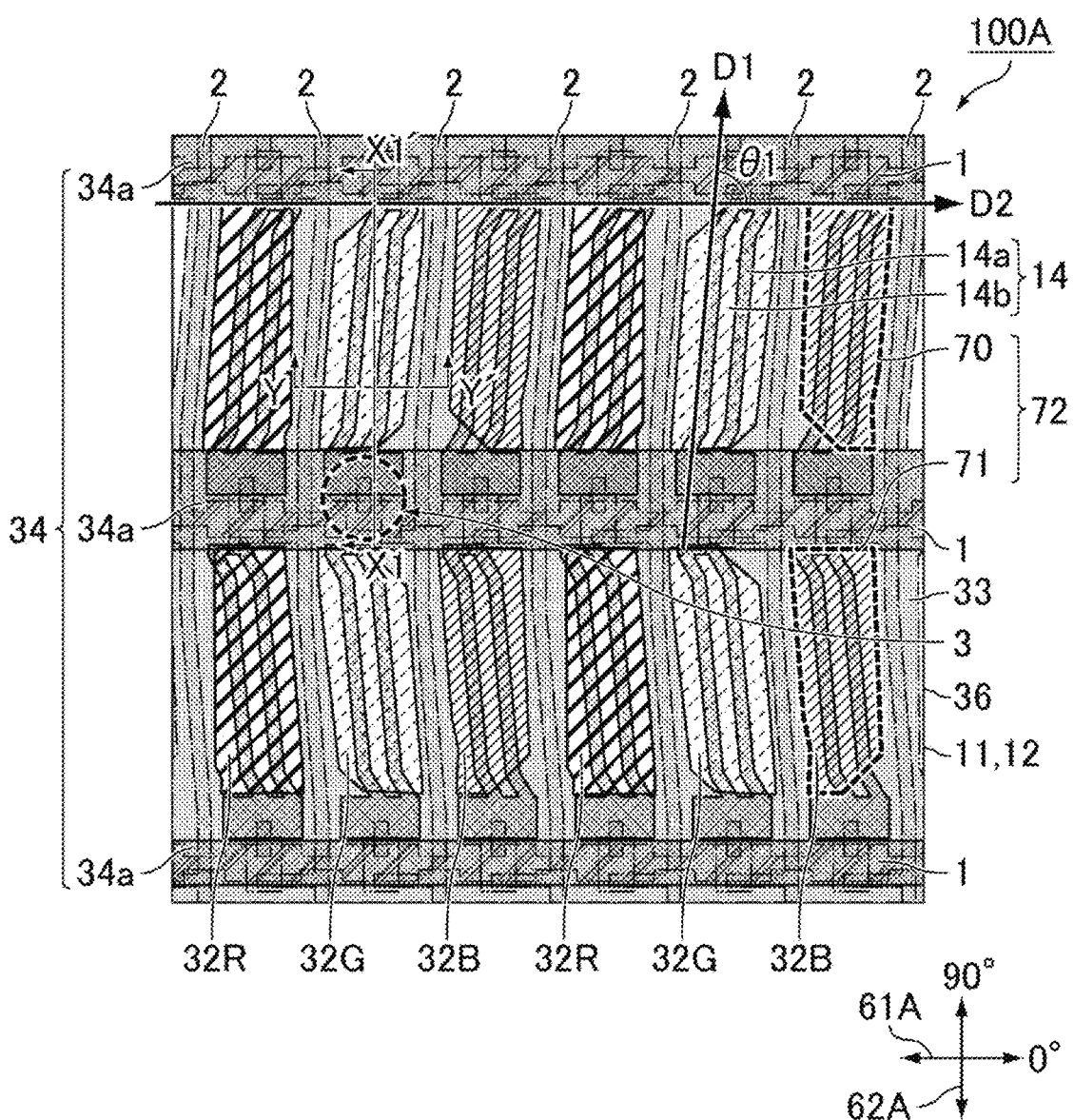
FIG. 1 is a schematic plan view of part of a liquid crystal panel of Embodiment 1.
Figure 2:
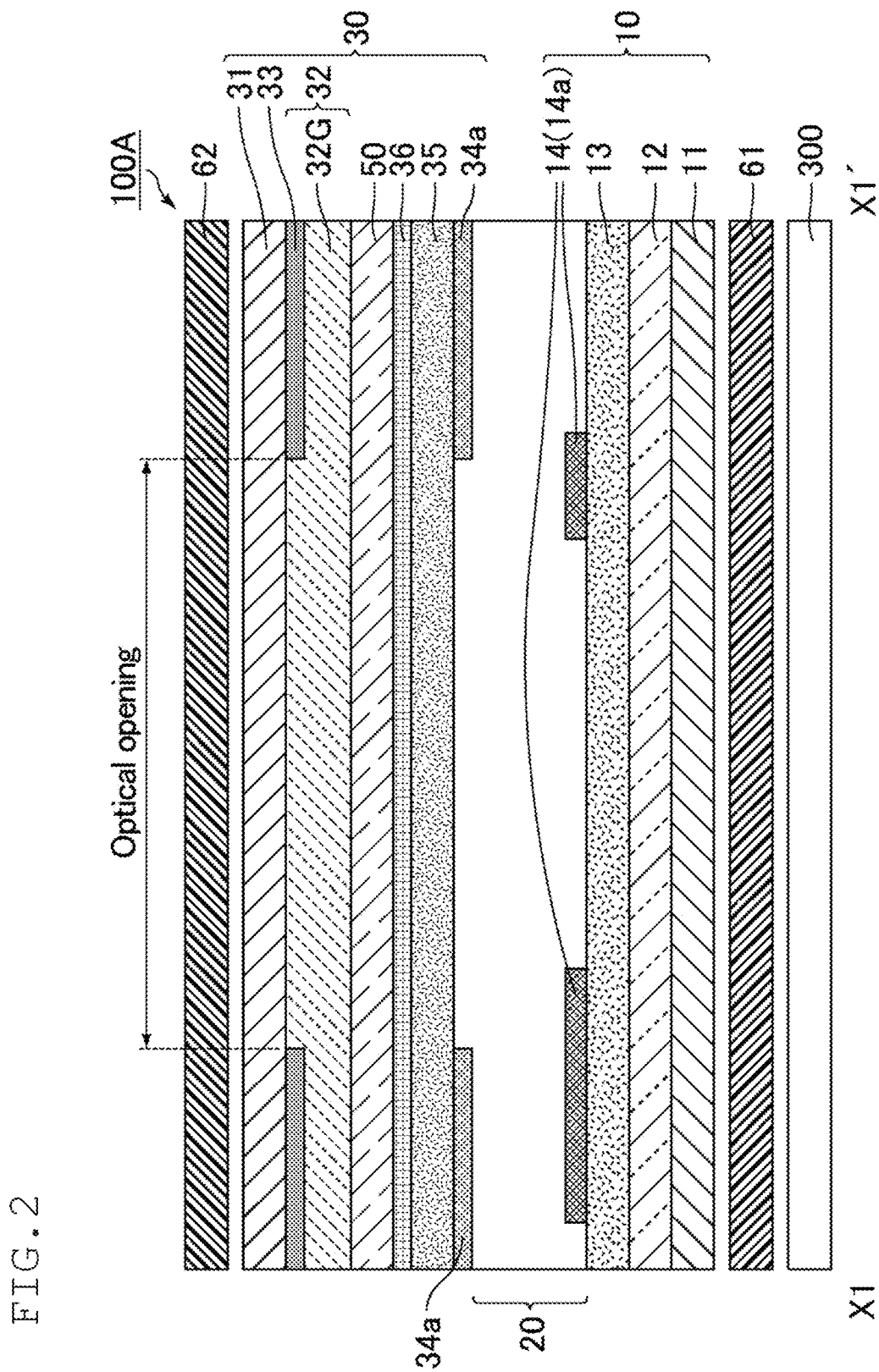
FIG. 2 is a schematic cross-sectional view taken along line X1-X1' in FIG. 1.
Figure 3:
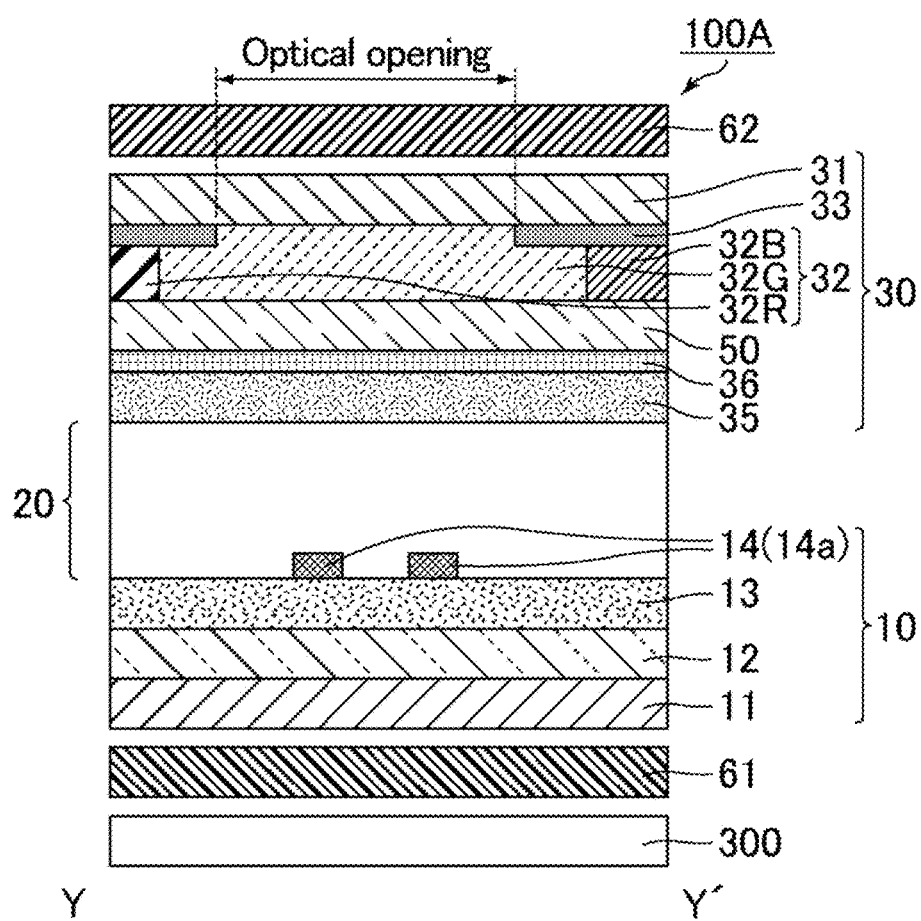
FIG. 3 is a schematic cross-sectional view taken along line Y-Y' in FIG. 1.

The liquid crystal display device of Embodiment 1 is described with reference to the drawings. FIG. 1 is a schematic plan view of part of a liquid crystal panel of Embodiment 1. FIG. 2 is a schematic cross-sectional view taken along line X1-X1' in FIG. 1. FIG. 3 is a schematic cross-sectional view taken along line Y-Y' in FIG. 1.

(Liquid Crystal Panel)

As shown in FIG. 1, the liquid crystal display device of Embodiment 1 includes a liquid crystal panel 100A in which sub-pixels are arranged in a matrix pattern. The active matrix substrate may include gate lines 1 and source lines 2 that intersect the gate lines 1. The "sub-pixel" as used herein refers to a region surrounded by two adjacent gate lines 1 and two adjacent source lines 2 as shown in FIG. 1. The later-described first sub-pixels 70 and second sub-pixels 71 are simply referred to as sub-pixels when no distinction is made between them. Thin film transistors (TFTs) 3 as switching elements may be arranged at the respective intersections between the gate lines 1 and the source lines 2.

Preferably, the sub-pixels each are provided with an optical opening that allows light to pass through the liquid crystal panel 100A. The optical openings correspond to the regions each surrounded by the dotted line inside a sub-pixel in FIG. 1. The optical openings in a transmissive or transflective liquid crystal panel 100A allow light from the back surface of the liquid crystal panel 100A to pass therethrough toward the front of the liquid crystal panel 100A. The optical openings in a reflective or transflective liquid crystal panel 100A allow light to pass therethrough, the light including incident light entering the liquid crystal panel 100A from the outside of the panel and reflection light emitted toward the outside of the liquid crystal panel 100A as a result of reflection of the incident light inside the liquid crystal panel 100A. The optical openings in a plan view may overlap, for example, a transparent component such as a polarizing plate or a color filter. Herein, a plan view means a view in which the liquid crystal panel is observed from the normal direction. The liquid crystal panel 100A in Embodiment 1 is a transmissive one.

As shown in FIG. 2 and FIG. 3, the liquid crystal panel 100A sequentially includes an active matrix substrate 10, a liquid crystal layer 20, and a color filter substrate 30. Herein, the side closer to the screen of the liquid crystal display device is also referred to as the "viewer side (front surface side)", and the side farther from the screen of the liquid crystal display device is also referred to as the "back surface side". The view from the direction normal to the front surface is also referred to as a "plan view".

The active matrix substrate 10 sequentially includes a first substrate 11, a first electrode 12, a first insulating layer 13, and second electrodes 14. The first electrode 12 and the second electrodes 14 are stacked with the first insulating layer 13 in between and constitute a fringe field switching (FFS) electrode structure. The first insulating layer 13 may be formed from, for example, an inorganic material such as silicon oxide or silicon nitride.

The first electrode 12 in Embodiment 1 is preferably a solid electrode. The solid electrode is a planar electrode without any slit or opening at least in a region coinciding with the optical opening of a sub-pixel in a plan view. One first electrode 12 may be disposed in each sub-pixel, may be disposed common to some sub-pixels, or may be formed over the entire display region regardless of the boundaries of the sub-pixels. The first electrode 12 may be formed from, for example, a transparent conductive material such as indium tin oxide (ITO) or indium zinc oxide (IZO).

As shown in FIG. 1, one second electrode 14 is disposed in each of the sub-pixels. Each second electrode 14 includes a first linear electrode 14a extending in the first direction D1. At least part of a second electrode 14 only needs to extend in the first direction D1, and the second electrode 14 may include a linear electrode that extends in a direction different from the first direction D1. There may be a plurality of the first linear electrodes 14a. The ends of adjacent first linear electrodes 14a may be connected by an electrode material, so that an opening surrounded by the electrode material is formed. Each second electrode 14 may be a comb-teeth electrode in which the ends of its adjacent first linear electrodes 14a are open, and a slit may be formed between adjacent first linear electrodes 14a. FIG. 1 shows a case where the ends of the first linear electrodes 14a are connected by an electrode material, so that the openings 14b are formed.

The width of the first linear electrode 14a may be, for example, 2 to 5 μm. The width of each slit or opening may be, for example, 2 to 5 μm. The width of the first linear electrode 14a and the width of each slit or opening each are the width in a direction perpendicular to the first direction D1.

The second electrodes 14 are formed from, for example, a transparent conductive material such as ITO or IZO. The second electrodes 14 each are electrically connected to the corresponding source line 2 through a semiconductor layer in the corresponding TFT 3, for example.

Either the first electrode 12 or the second electrodes 14 are preferably arranged with electrical connection over the sub-pixels. The expression "over the sub-pixels" means that the electrode overlaps the sub-pixels by crossing the boundaries of the sub-pixels. With either the first electrode 12 or the second electrodes 14 electrically connected over the sub-pixels, common constant voltage can be applied to the first electrode 12 or the second electrodes 14 in the sub-pixels.

The first substrate 11 and the later-described second substrate 31 are not limited, and may each be, for example, a substrate formed from a resin such as polycarbonate or a glass substrate.

The liquid crystal layer 20 contains liquid crystal molecules. The liquid crystal molecules preferably have a positive anisotropy of dielectric constant (Δε) defined by the following formula (L) (positive type liquid crystal molecules). The liquid crystal molecules preferably align homogeneously in the state where no voltage is applied (in the state with no voltage applied). The direction of the major axes of the liquid crystal molecules in the state with no voltage applied is also referred to as the initial alignment direction of the liquid crystal molecules. The state with no voltage applied includes the states where the voltage applied to the liquid crystal layer is lower than the threshold of the liquid crystal molecules.

Δε=(dielectric constant in major axis direction of liquid crystal molecules)−(dielectric constant in minor axis direction of liquid crystal molecules) (L)

The color filter substrate 30 includes a second substrate 31, a black matrix 33, a color filter layer with color filters 32, a third electrode 34, and a fourth electrode 36. In Embodiment 1, a case is described where the color filter substrate 30 sequentially includes the second substrate 31, the black matrix 33, the color filters 32, a first dielectric layer 50, the fourth electrode 36, a second dielectric layer 35, and the third electrode 34.

The third electrode 34 includes second linear electrodes 34a extending in the second direction D2 that intersects the first direction D1. The first direction D1 is the direction in which the first linear electrode 14a of each second electrode 14 extends. The second linear electrodes 34a are also considered to form stripes horizontal to the first direction D1. With such second linear electrodes 34a forming horizontal stripes, for example, the privacy can be enhanced as compared with the cases where the second electrodes 34a extend in the same direction as the first direction D1 (when they form vertical stripes) or are arranged in the same pattern as the black matrix. Specifically, the front contrast ratio during display in the privacy mode can be increased and the contrast ratio in the horizontal direction (for example, the contrast ratio when the liquid crystal panel is observed from an azimuth of 0° or 180° at a polar angle of 45°) can be decreased. As described later, application of driving voltage to the third electrode 34 enables generation of an electric field in the thickness direction of the liquid crystal layer 20, so that the mode can be switched between the privacy mode and the public mode.

The angle θ1 formed by the first direction D1 and the second direction D2 is preferably 80° or greater and 100° or smaller, more preferably 85° or greater and 95° or smaller. The second direction D2 may be parallel to the absorption axis 62A of the second polarizing plate 62 or the absorption axis 61A of the first polarizing plate 61. In Embodiment 1, as shown in FIG. 1, the second direction D2 is set parallel to the absorption axis 61A of the first polarizing plate 61 (at the 0°-180° azimuth).

The second linear electrodes 34a are preferably electrically connected to one another. The second linear electrodes 34a may be, for example, connected by the connection portions at the ends of the liquid crystal panel. The second linear electrodes 34a and the connection portions may be collectively referred to as the third electrode 34.

The third electrode 34 overlaps at least part of the black matrix 33 in a plan view. With the third electrode 34 overlapping at least part of the black matrix 33, in a conventional liquid crystal display device, application of voltage to the third electrode 34 causes charging of the black matrix 33 (see FIG. 22). However, even when the third electrode 34 overlaps at least part of the black matrix 33, the present embodiment with the fourth electrode 36 can prevent charging of the black matrix 33.

The second linear electrodes 34a in a plan view may extend in the second direction D2 that intersects the first direction D1 and each overlap a portion of the black matrix extending in the second direction D2. The second linear electrodes 34a may be arranged along the ends of each sub-pixel in the second direction D2 (the top and bottom ends of each sub-pixel in FIG. 1).

Preferably, the second linear electrodes 34a do not overlap the optical openings in a plan view. With such portions of the third electrode 34 not overlapping the optical openings, the vertical electric fields are less likely to work in the openings in the sub-pixels during display in the public mode, so that a high transmittance and a high contrast ratio can be achieved.

The gate lines 1 described above may extend in the second direction D2 in which the second linear electrodes 34a extend. At least part of the third electrode 34 may overlap a gate line 1 in a plan view. For enhancement of the privacy, the width of each second linear electrode 34a may be greater than the width of each gate line 1.

The width of each second linear electrode 34a is preferably 5 μm or greater. The upper limit of the width of each second linear electrode 34a may be any value with which the second linear electrode 34a does not overlap an optical opening and may be 50 μm, for example. The lower limit of the width of each second linear electrode 34a is more preferably 15 μm, the upper limit thereof is more preferably 40 μm. The width of each second linear electrode 34a means the electrode width in a direction perpendicular to the second direction D2.

The third electrode 34 may be formed from, for example, a transparent conductive material such as ITO or IZO.

The fourth electrode 36 is disposed between the black matrix 33 and the third electrode 34. Constant voltage is applied to the fourth electrode 36. When voltage is applied to the third electrode 34, the fourth electrode 36 functions as a shield electrode that blocks an electric field generated between the third electrode 34 and the black matrix 33 to prevent charging of the black matrix 33. Thus, with the fourth electrode 36, in black display in the privacy mode, generation of light leakage on a source line 2 due to a shift of the alignment azimuth of the liquid crystal molecules from the absorption axis of a polarizing plate can be prevented, so that the front contrast ratio can be increased.

For further enhancement of the shield effect, the area of the fourth electrode 36 is preferably greater than the area of the black matrix. Embodiment 1 shows a case where the fourth electrode 36 is a solid electrode. The fourth electrode 36 in a plan view preferably overlaps at least part of the black matrix 33 and overlaps at least part of each optical opening. The fourth electrode 36 is formed from, for example, a transparent conductive material such as ITO or IZO.

Preferably, the second dielectric layer 35 is disposed between the third electrode 34 and the fourth electrode 36. The second dielectric layer 35 can be formed from a resin such as an acrylic resin or a polyimide-based resin. The second dielectric layer 35 is formed from a resin transparent to light, for example. The total light transmittance of the second dielectric layer 35 is preferably 80% or higher. Herein, the total light transmittance is measured in conformity with JIS K7361-1. Although components such as the color filters 32 of the color filter substrate 30 are often formed from an organic material, a large difference in thermal stress between the components such as the color filters 32 and the second dielectric layer 35 may cause a crack in the third electrode 34 and/or the fourth electrode 36. Thus, for reduction of difference in thermal stress, preferably, the second dielectric layer 35 is formed from the above resin and the surface of the third electrode 34 is flattened to block an electric field.

The color filters 32 coincide with the optical openings in the respective sub-pixels in observation from the front of the liquid crystal panel 100A. The color filters 32 include, for example, red color filters 32R, green color filters 32G, and blue color filters 32B. The color filters 32, for example, may include color filters of the same color consecutively formed in the row direction or column direction of the liquid crystal panel 100A. The color filters 32 preferably define a dielectric layer.

The black matrix 33 is disposed between adjacent sub-pixels. The black matrix 33 may be disposed between adjacent optical openings in the row or column direction or may surround the optical openings in a plan view. The black matrix 33 may be one usually used in the field of liquid crystal display devices, and is preferably formed from a resin, more preferably a black resin. The resistivity of the black matrix 33 is, for example, $1.0 \times 10^{10}$ to $1.0 \times 10^{13}$ ($\Omega \cdot cm$).

The first dielectric layer 50 is between the black matrix 33 and the third electrode 34. With the first dielectric layer 50, the black matrix 33 is spaced from the third electrode 34. This structure can reduce charging of the black matrix 33 due to voltage application to the third electrode 34.

The dielectric constant $\varepsilon$ of the first dielectric layer 50 may be, for example, $\varepsilon = 3$ to 4. The thickness of the first dielectric layer 50 is preferably 0.5 μm or greater and 4 μm or smaller. The first dielectric layer 50 is a layer different from the color filters 32 and is formed from a resin transparent to light, for example. The total light transmittance of the first dielectric layer 50 is preferably 80% or higher. The first dielectric layer 50 can be formed from, for example, a resin such as an acrylic resin or a polyimide-based resin. Too thick the first dielectric layer 50 may cause oblique chromatic parallax, leading to a failure in displaying the desired color. With a thickness of the first dielectric layer 50 of 4 μm or greater, the surface of the first dielectric layer 50 is likely to be uneven, which may lead to display unevenness.

Although not shown, alignment films may be disposed, one between the active matrix substrate 10 and the liquid crystal layer 20 and the other between the color filter substrate 30 and the liquid crystal layer 20. The alignment films control the initial alignment azimuth of the liquid crystal molecules with no voltage applied. The alignment films are preferably horizontal alignment films. Horizontal alignment films each preferably provide an initial pre-tilt angle (with no voltage applied to the liquid crystal layer) of 0° to 1° from the surface thereof to the liquid crystal molecules.

A first polarizing plate 61 facing the liquid crystal layer 20 across the active matrix substrate 10 and a second polarizing plate 62 facing the liquid crystal layer 20 across the color filter substrate 30 may be disposed. The first polarizing plate 61 and the second polarizing plate 62 are preferably arranged with their absorption axis 61A and absorption axis 62A being perpendicular to each other, i.e., in crossed Nicols. FIG. 1 shows that the absorption axis 61A of the first polarizing plate 61 is at the 0°-180° azimuth and the absorption axis 62A of the second polarizing plate 62 is at the 90°-270° azimuth. The first polarizing plate 61 and the second polarizing plate 62 are preferably linearly polarizing plates.

Figure 4:
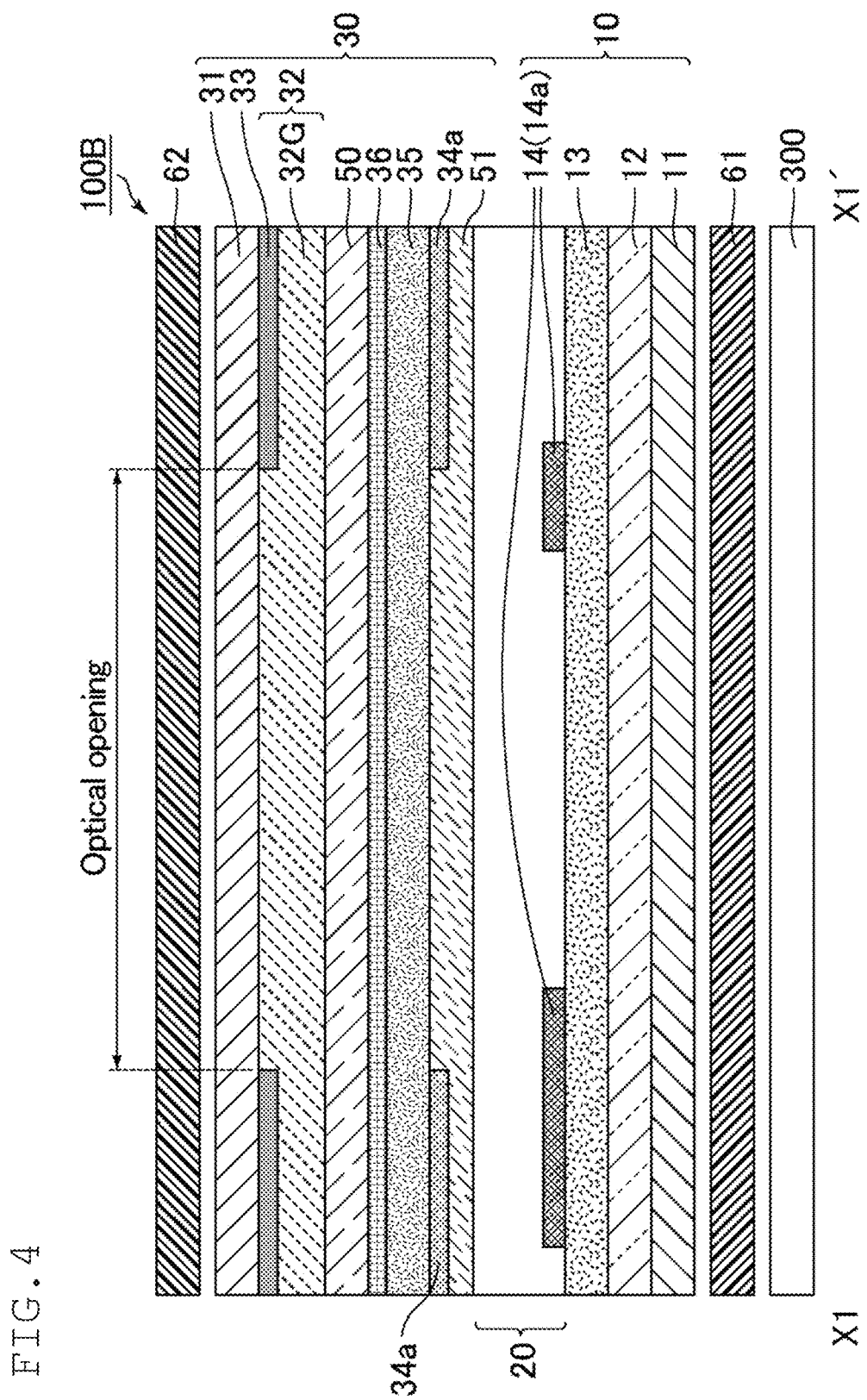
FIG. 4 is a schematic cross-sectional view showing an example in which a third dielectric layer is disposed in the liquid crystal panel in FIG. 2.

FIG. 4 is a schematic cross-sectional view showing an example in which a third dielectric layer is disposed in the liquid crystal panel in FIG. 2. The liquid crystal panel 100B may include a third dielectric layer 51 between the third electrode 34 and the liquid crystal layer 20. The liquid crystal panel 100B has the same configuration as the liquid crystal panel 100A, except that it includes the third dielectric layer 51. The third dielectric layer 51 is a layer different from an alignment film and is preferably disposed between the third electrode 34 and the alignment film. With the third dielectric layer 51, in the public mode, generation of an unnecessary vertical electric field can be reduced or prevented between the third electrode 34 and the electrodes in the active matrix substrate. This enables horizontal electric field driving with almost no rising of the liquid crystal molecules, thus increasing the transmittance in white display at the front and the front contrast ratio during display in the public mode.

The dielectric constant $\varepsilon$ of the third dielectric layer 51 may be, for example, $\varepsilon = 3$ to 4. The thickness of the third dielectric layer 51 is preferably 0.5 μm or greater and 4 μm or smaller. With a thickness of the third dielectric layer 51 of greater than 4 μm, chromatic parallax may occur to decline the display quality. The third dielectric layer 51 can be formed from the same material as the first dielectric layer 50. The total light transmittance of the third dielectric layer 51 is preferably 80% or higher.

The liquid crystal display device of Embodiment 1 may include a backlight 300 behind the back surface of the liquid crystal panel 100A or 100B (behind the active matrix substrate 10). The backlight 300 may be any backlight usually used in the field of liquid crystal display devices. The backlight 300 may be a transmissive backlight or an edge-lit backlight. For further enhancement of the privacy in the privacy mode, the backlight 300 may be a backlight including the later-described shading louver.

The liquid crystal panels 100A and 100B of Embodiment 1 may be in-cell touch panels. When the liquid crystal panels 100A and 100B are in-cell touch panels, the active matrix substrate 10 may further include touch panel lines. The touch panel lines may, for example, each have substantially the same width as a source line 2 and overlap a source line 2 in a plan view. The touch panel lines may be disposed between the first electrode 12 and the second electrodes 14 in a cross-sectional view. Although the fourth electrode 36 in Embodiment 1 is a solid electrode, the signal-to-noise ratio (S/N) can be made high when the resistivity of the fourth electrode 36 is high.

Thus, the liquid crystal panel can detect the capacitance between the finger and the touch panel lines. The resistivity of the fourth electrode 36 is considered high when the resistivity is, for example, $1.0 \times 10^6$ to $1.0 \times 10^8$ ($\Omega \cdot cm$). The resistivity of the fourth electrode 36 can be adjusted by a method of forming a film (e.g., sputtering) of an electrode material in formation of the fourth electrode 36.

Embodiment 2

Figure 5A:
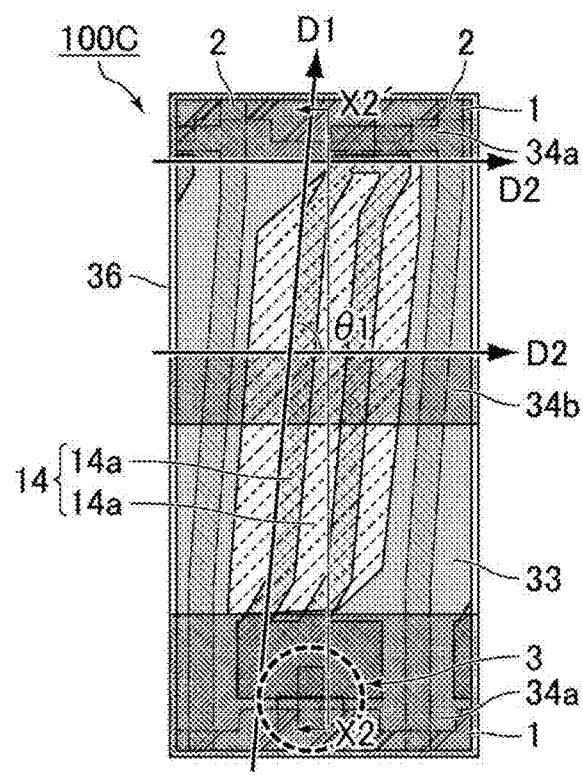
FIG. 5A is a schematic plan view of a sub-pixel in the liquid crystal panel of Embodiment 2.
Figure 5B:
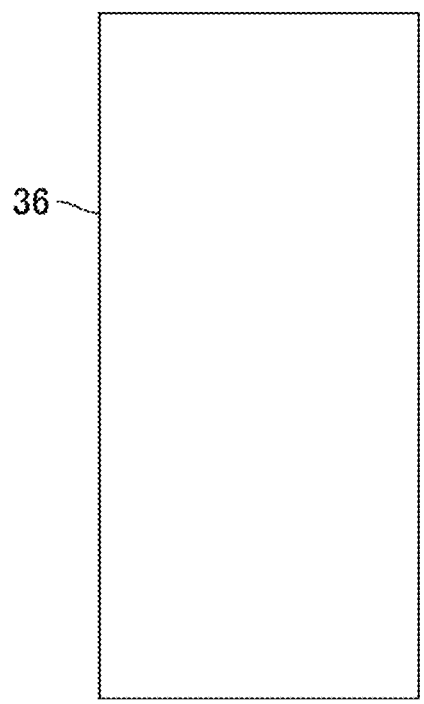
FIG. 5B is a schematic plan view of the fourth electrode in FIG. 5A.

A liquid crystal display device of Embodiment 2 has the same configuration as in Embodiment 1, except that the third electrode includes a third linear electrode. FIG. 5A is a schematic plan view of a sub-pixel in the liquid crystal panel of Embodiment 2. FIG. 5B is a schematic plan view of the fourth electrode in FIG. 5A. FIG. 6 is a schematic cross-sectional view taken along line X2-X2' in FIG. 5A.

As shown in FIG. 5A, in a liquid crystal panel 100C of Embodiment 2, in a plan view, the third electrode 34 includes a third linear electrode 34b extending in the second direction D2 and overlapping the optical opening of the sub-pixel. With the third electrode 34 including the third linear electrode 34b, an increase in the contrast ratio in observation from the horizontal direction can be further reduced or prevented while the high front contrast ratio is maintained. The third linear electrode 34b may be disposed between the second linear electrodes 34a arranged along the ends of each sub-pixel in the second direction D2 (the top and bottom ends of each sub-pixel in FIG. 1).

The third linear electrode 34b is preferably electrically connected to the second linear electrodes 34a, and the same voltage is preferably applied to the entire third electrode 34. The width of the third linear electrode 34b is preferably smaller than the width of each second linear electrode 34a.

As shown in FIG. 5A and FIG. 6, when one third linear electrode 34b is disposed in each sub-pixel, the third linear electrode 34b is preferably disposed in the center of the optical opening in the sub-pixel. The third linear electrode 34b only needs to overlap at least part of the optical opening. When one third linear electrode 34b is disposed in each sub-pixel, the width of the third linear electrode 34b is preferably 3 µm or greater and 10 µm or smaller. The lower limit of the width of the third linear electrode 34b is more preferably 5 µm, and the upper limit thereof is more preferably 7 µm.

As shown in FIG. 5B, the fourth electrode 36 in Embodiment 2 may overlap the third linear electrode 34b in the optical opening in each sub-pixel. Specifically, the fourth electrode 36 may be a planar electrode (solid electrode) without any slit or opening at least in a region coinciding with the optical opening of a sub-pixel in a plan view as in Embodiment 1. Even when the fourth electrode 36 is a solid electrode, the S/N can be made high when the resistivity of the fourth electrode 36 is high. Thus, the liquid crystal panel 100C and the later-described liquid crystal panel 100D in Embodiment 2 can each be an in-cell touch panel as in Embodiment 1.

Figure 7:
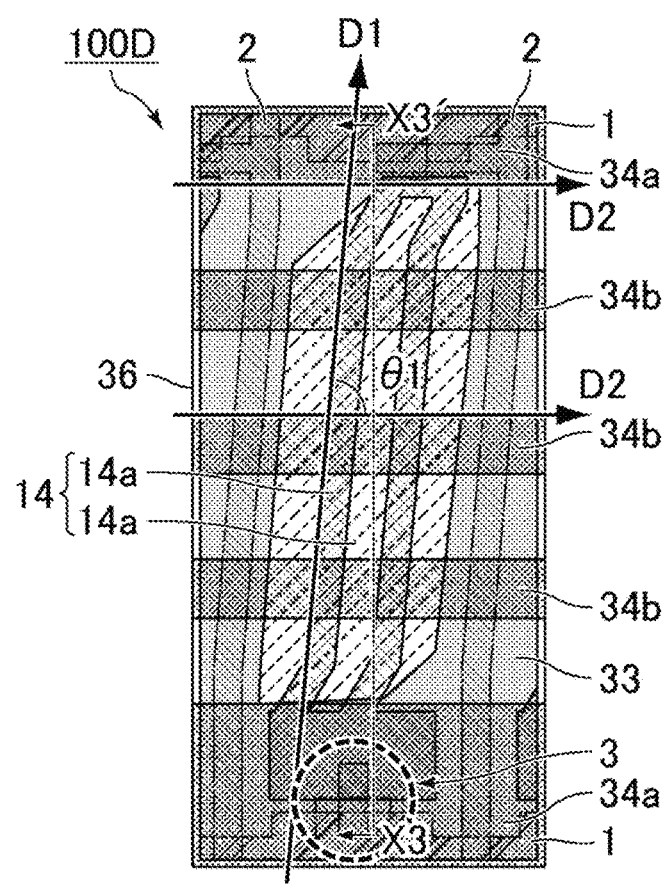
FIG. 7 is a schematic plan view of a sub-pixel showing another example of Embodiment 2.
Figure 8:
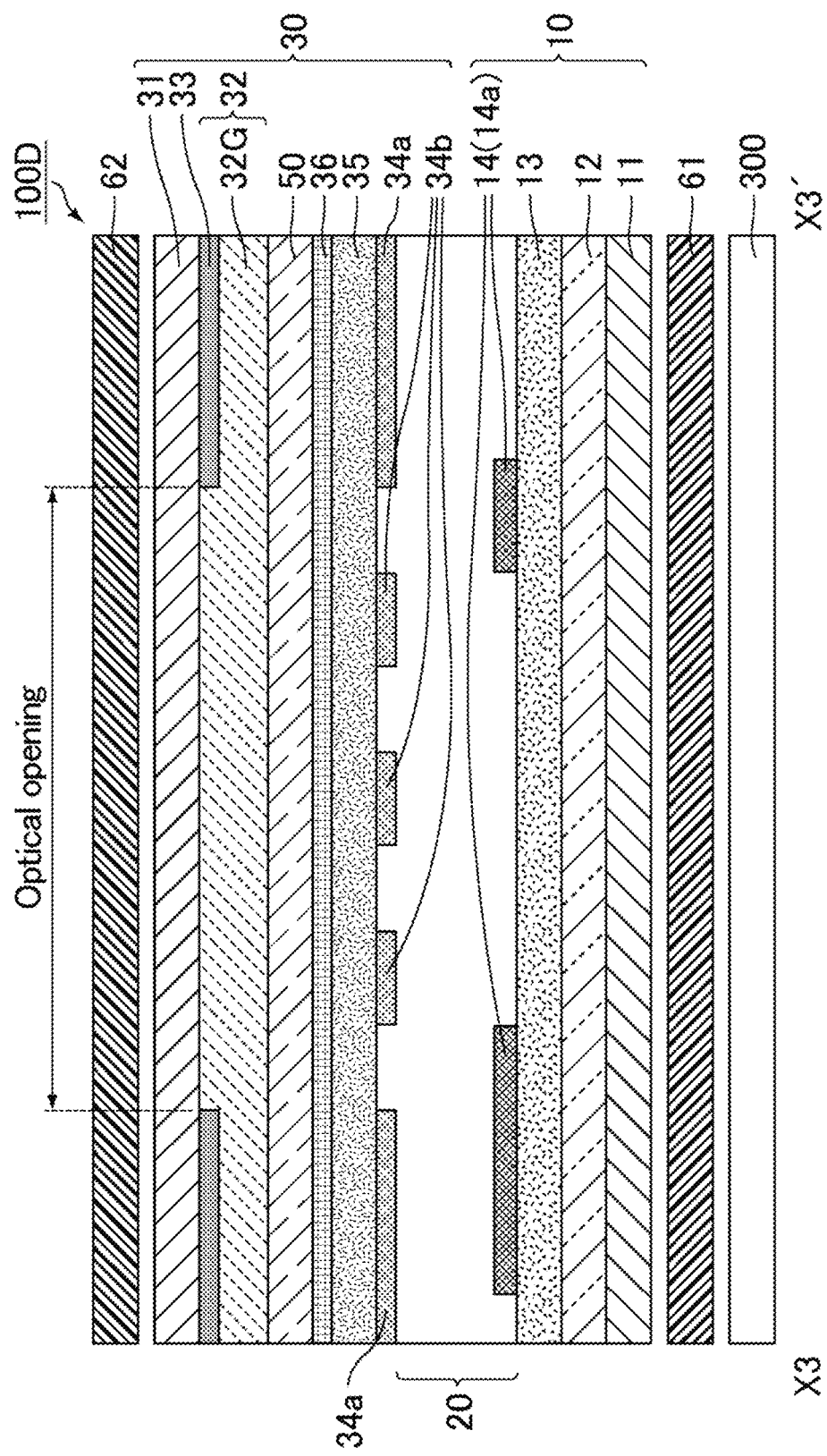
FIG. 8 is a schematic cross-sectional view taken along line X3-X3' in FIG. 7.

FIG. 7 is a schematic plan view of a sub-pixel showing another example of Embodiment 2. FIG. 8 is a schematic cross-sectional view taken along line X3-X3' in FIG. 7. The liquid crystal panel 100D may include a plurality of the third linear electrodes 34b positioned to overlap the optical opening of the sub-pixel. FIG. 7 and FIG. 8 show an example in which three third linear electrodes 34b are disposed. With a plurality of the third linear electrodes 34b, an increase in the contrast ratio when the liquid crystal panel is observed from the horizontal direction (for example, when the liquid crystal panel is observed from an azimuth of 0° or 180° at a polar angle of 45°) can be more reduced or prevented than with one third linear electrode 34b, while a high front contrast ratio is maintained.

When there is a plurality of the third linear electrodes 34b, the width of each third linear electrode 34b is preferably smaller than the width of each second linear electrode 34a. The width of each third linear electrode 34b is preferably 3 µm or greater and 12 µm or smaller. With the width of each third linear electrode 34b failing within the range above, in the privacy mode, the front contrast ratio can be increased while an increase in the contrast ratio at a polar angle of 45° can be sufficiently reduced or prevented. The lower limit of the width of each third linear electrode 34b is more preferably 5 µm, and the upper limit thereof is more preferably 10 µm. For a further increase in the front contrast ratio in the public mode, the width of each third linear electrode 34b is more preferably 10 µm. The width of each third linear electrode 34b means the electrode width in a direction perpendicular to the second direction D2.

When there is a plurality of third linear electrodes 34b, the third linear electrodes 34b are preferably equally spaced from one another. The distance between adjacent third linear electrodes 34b is preferably 10 µm or longer and 50 µm or shorter. The lower limit of the distance between adjacent third linear electrodes 34b is more preferably 15 µm, and the upper limit thereof is more preferably 40 µm.

The third linear electrodes 34b may be, for example, connected by connection portions at the ends of the liquid crystal panel. The second linear electrodes 34a, the third linear electrodes 34b, and the connection portions may be collectively referred to as the third electrode 34.

Figure 9:
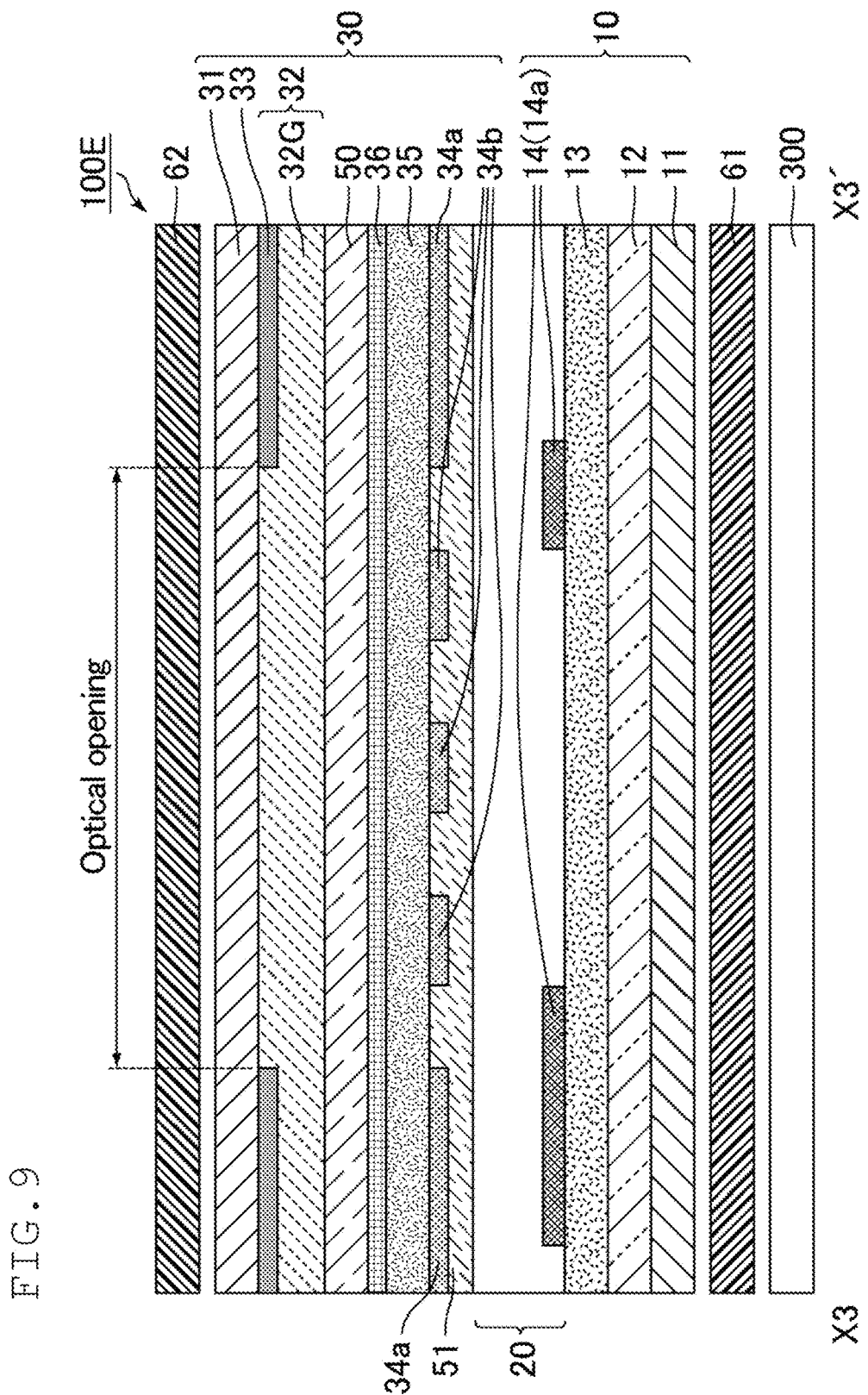
FIG. 9 is a schematic cross-sectional view showing an example in which a third dielectric layer is disposed in the liquid crystal panel in FIG. 8.

Also in Embodiment 2, the third dielectric layer 51 may be disposed between the third electrode 34 and the liquid crystal layer 20. FIG. 9 is a schematic cross-sectional view showing an example in which the third dielectric layer 51 is disposed in the liquid crystal panel in FIG. 8. A liquid crystal panel 100E, including the third dielectric layer 51, can increase the contrast ratio during display in the public mode.

Embodiment 3

Figure 10:
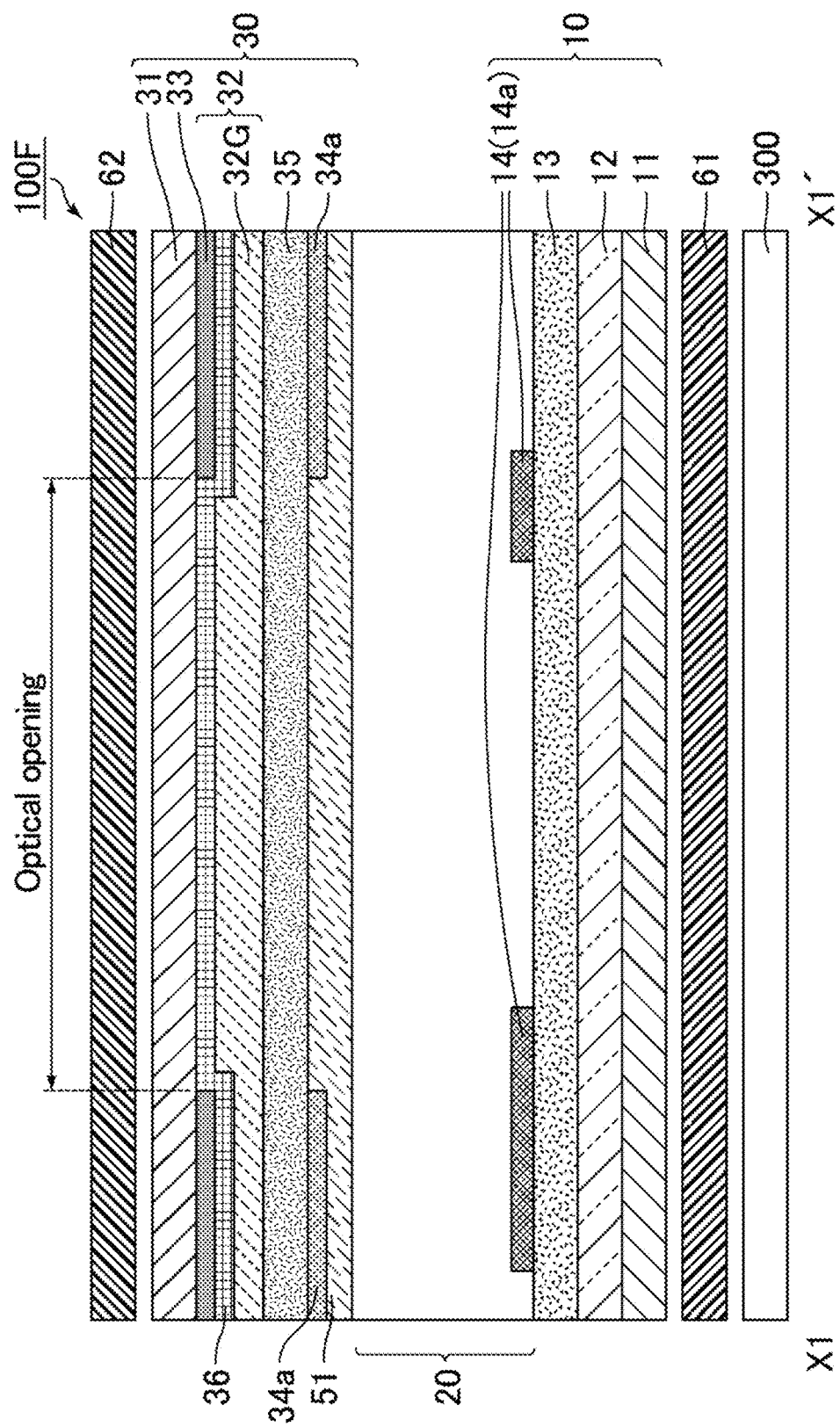
FIG. 10 is a schematic cross-sectional view of a liquid crystal panel of Embodiment 3.

A liquid crystal display device of Embodiment 3 has the same configuration as in Embodiment 1, except for the position of the fourth electrode in a cross-sectional view. FIG. 10 is a schematic cross-sectional view of a liquid crystal panel of Embodiment 3. FIG. 10 corresponds to a schematic cross-sectional view taken along line X1-X1' in FIG. 1. Since a schematic plan view thereof is the same as FIG. 1, description thereof is omitted.

As shown in FIG. 10, in a liquid crystal panel 100F of Embodiment 3, the color filter substrate 30 sequentially includes the second substrate 31, the black matrix 33, the fourth electrode 36, the color filters 32, the second dielectric layer 35, and the third electrode 34. Also in Embodiment 3, with the fourth electrode 36, charging of the black matrix 33 can be prevented. This can prevent occurrence of light leakage in black display in the privacy mode, thus increasing the front contrast ratio. In addition, since the fourth electrode 36 is on the black matrix 33, the color filters 32 as well as the second dielectric layer 35 insulates between the third electrode 34 and the fourth electrode 36. For reduction of open-circuiting of the third electrode 34, preferably, the second dielectric layer 35 is disposed on the color filters 32 and flattened, and then the third electrode 34 is formed.

In the liquid crystal panel 100F, the fourth electrode 36 may be a solid electrode as shown in FIG. 5B. Even when the fourth electrode 36 is a solid electrode, a sufficient S/N can be achieved when the resistivity of the fourth electrode 36 is high. Thus, the liquid crystal panel 100F in Embodiment 3 can be an in-cell touch panel as in Embodiment 1.

The third dielectric layer 51 may be disposed between the third electrode 34 and the liquid crystal layer 20. With the third dielectric layer 51, the contrast ratio during display in the public mode can be made high.

Embodiment 4

Figure 11A:
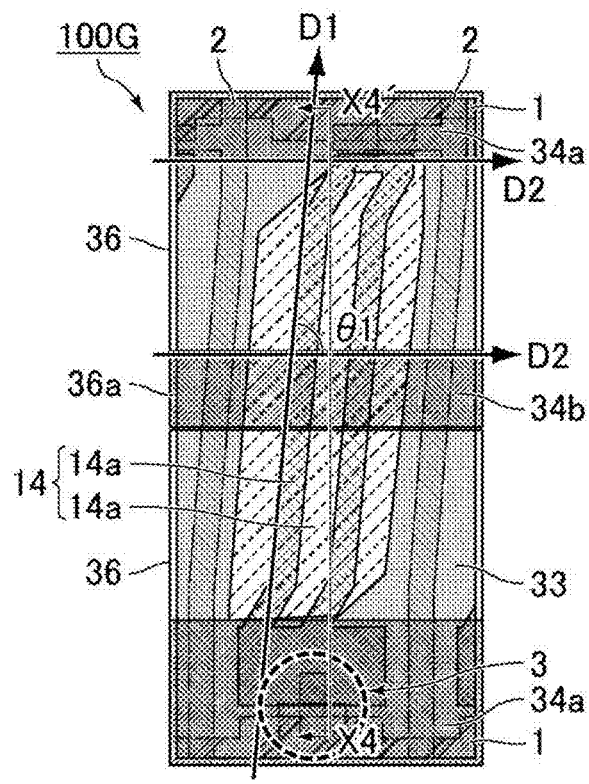
FIG. 11A is a schematic plan view of a sub-pixel in the liquid crystal panel of Embodiment 4.
Figure 11B:
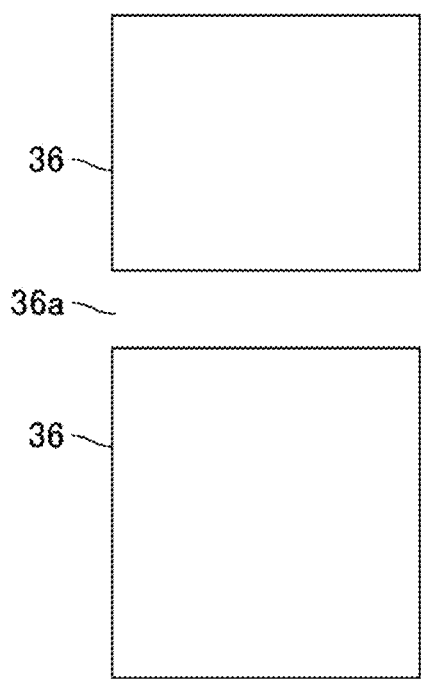
FIG. 11B is a schematic plan view of the fourth electrode in FIG. 11A.
Figure 12:
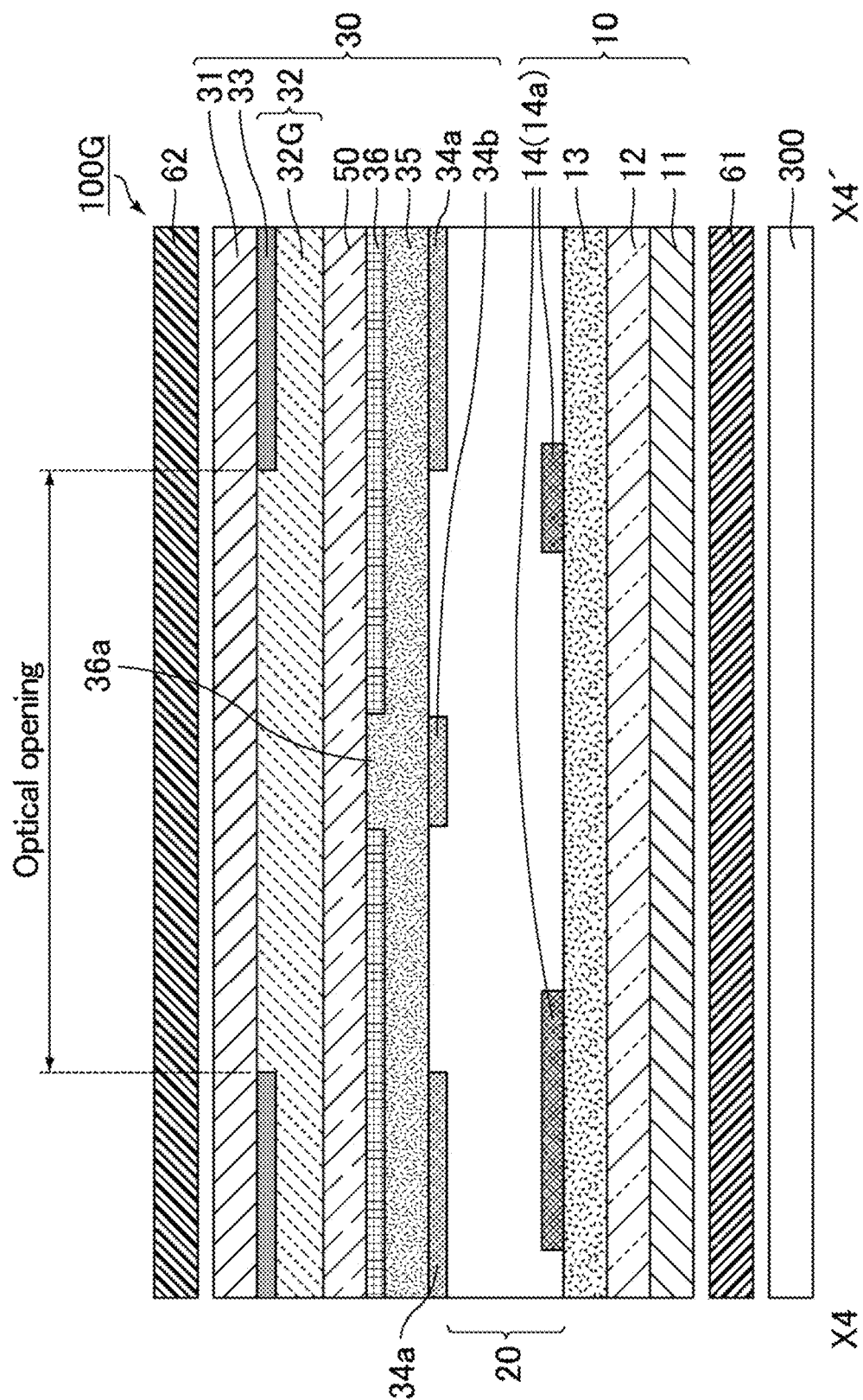
FIG. 12 is a schematic cross-sectional view taken along line X4-X4' in FIG. 11A.

A liquid crystal display device of Embodiment 4 has the same configuration as in Embodiment 2, except that the fourth electrode includes an opening. FIG. 11A is a schematic plan view of a sub-pixel in the liquid crystal panel of Embodiment 4. FIG. 11B is a schematic plan view of the fourth electrode in FIG. 11A. FIG. 12 is a schematic cross-sectional view taken along line X4-X4' in FIG. 11A.

Embodiment 4 relates to a case where the third electrode 34 includes the third linear electrode 34b. The fourth electrode 36 includes an opening 36a positioned to overlap the third linear electrode 34b in a plan view. With the fourth electrode 36 including the opening 36a positioned to overlap the third linear electrode 34b in a plan view, the transmittance can be increased.

The number of the openings 36a in each sub-pixel is not limited, and may be the same as the number of the third linear electrodes 34b disposed in each sub-pixel. When one third linear electrode 34b is disposed in each sub-pixel, one opening 36a may be positioned to overlap the optical opening.

The shape of the opening 36a is not limited, and may be a rectangle that overlaps the third linear electrodes 34b in a plan view. Although not shown, the opening 36a may be surrounded by the electrode portion of the fourth electrode 36.

Figure 13A:
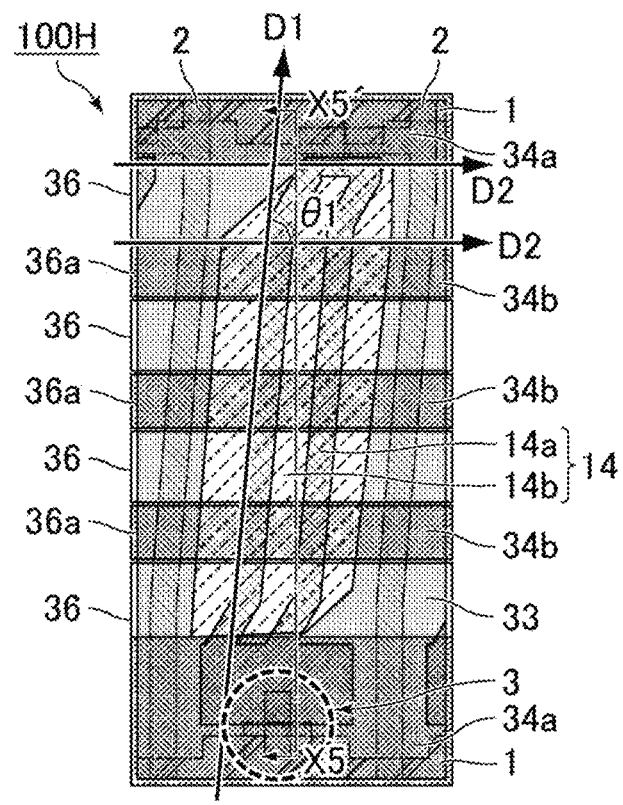
FIG. 13A is a schematic plan view of a sub-pixel showing another example of Embodiment 4.
Figure 13B:
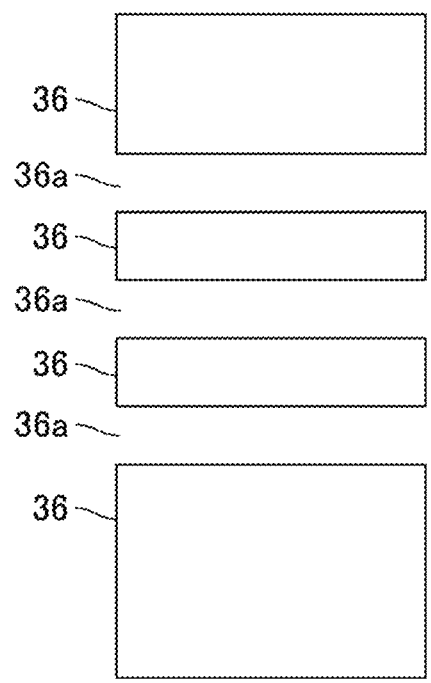
FIG. 13B is a schematic plan view of the fourth electrode in FIG. 13A.
Figure 14:
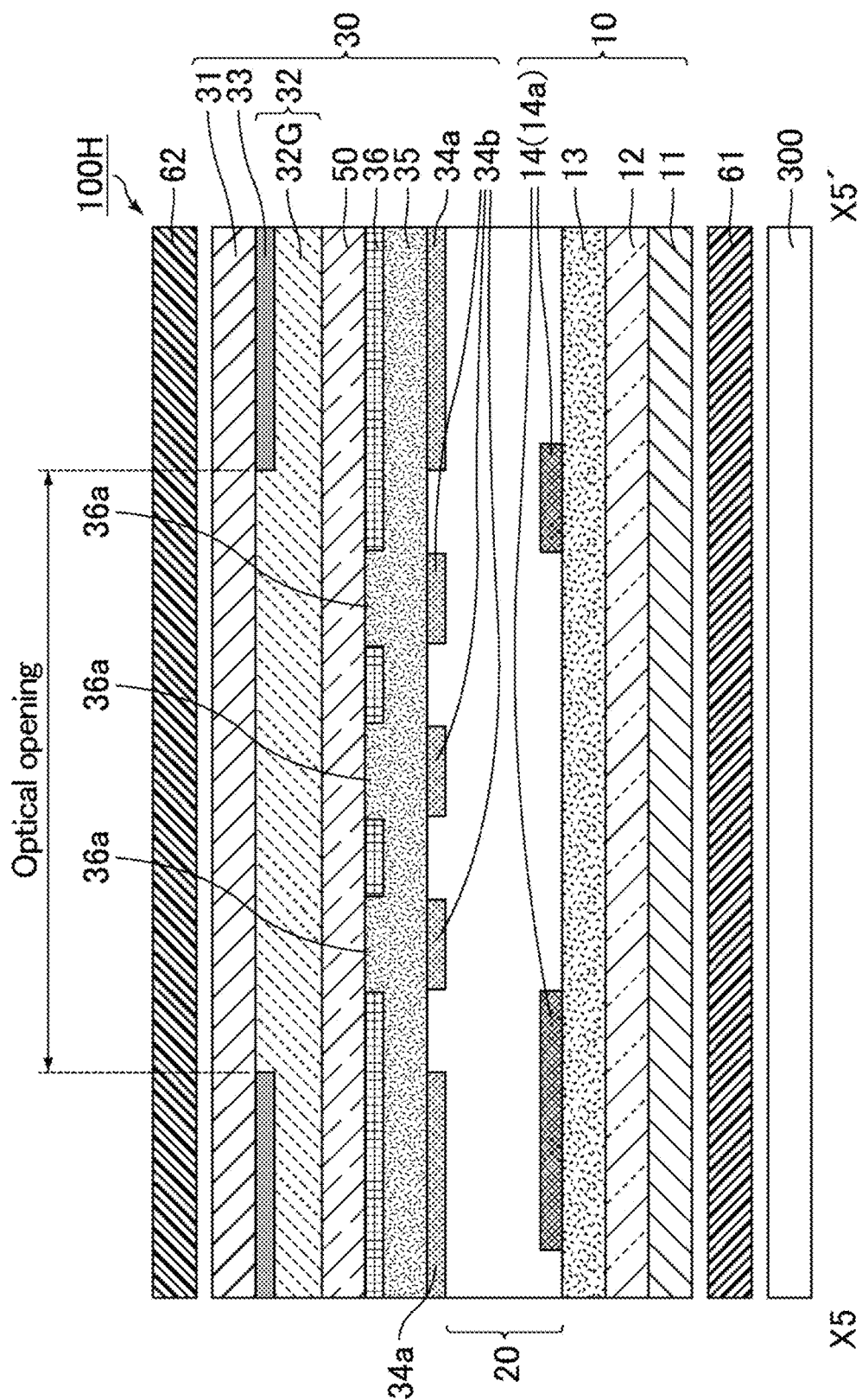
FIG. 14 is a schematic cross-sectional view taken along line X5-X5' in FIG. 13A.

FIG. 13A is a schematic plan view of a sub-pixel showing another example of Embodiment 4. FIG. 13B is a schematic plan view of the fourth electrode in FIG. 13A. FIG. 14 is a schematic cross-sectional view taken along line X5-X5' in FIG. 13A. When three third linear electrodes 34b are disposed in each sub-pixel, three openings 36a may be positioned to overlap the optical opening. The fourth electrode 36 may be disposed between adjacent third linear electrodes 34b in a plan view.

The liquid crystal panels 100G and 100H in Embodiment 4 can be in-cell touch panels. With the opening(s) 36a, the S/N can be made higher than that in Embodiment 1 while charging of the black matrix 33 is prevented. Thus, the liquid crystal panels can provide a sufficient capacitance between the finger and the touch panel lines.

Embodiment 5

The following Embodiment 5 relates to the control circuit, display method, and veil-view display of a liquid crystal display device.
(Control Circuit)

The control circuit can switch between a first display mode and a second display mode. The first display mode allows a first image to be observed in a narrow viewing angle range including a direction normal to the liquid crystal panel. The second display mode allows the first image to be observed in a wide viewing angle range including the narrow viewing angle range.

Herein, the first display mode is also referred to as the privacy mode, and the second display mode is also referred to as the public mode. In the narrow viewing angle range, the contrast ratio is preferably 20 or lower, more preferably 10 or lower, when the liquid crystal panel is observed from the horizontal direction (azimuth of 0° or azimuth of 180°) at a certain polar angle. The polar angle is preferably 60° or greater, more preferably 45° or greater, still more preferably 30° or greater, when, for example, a direction vertical to the surface of the liquid crystal panel is set at a polar angle of 0° and a direction horizontal to the surface of the liquid crystal panel is set at a polar angle of 90°. The wide viewing angle range means a polar angle range wider than the polar angle range defining the narrow viewing angle range.

Figure 15:
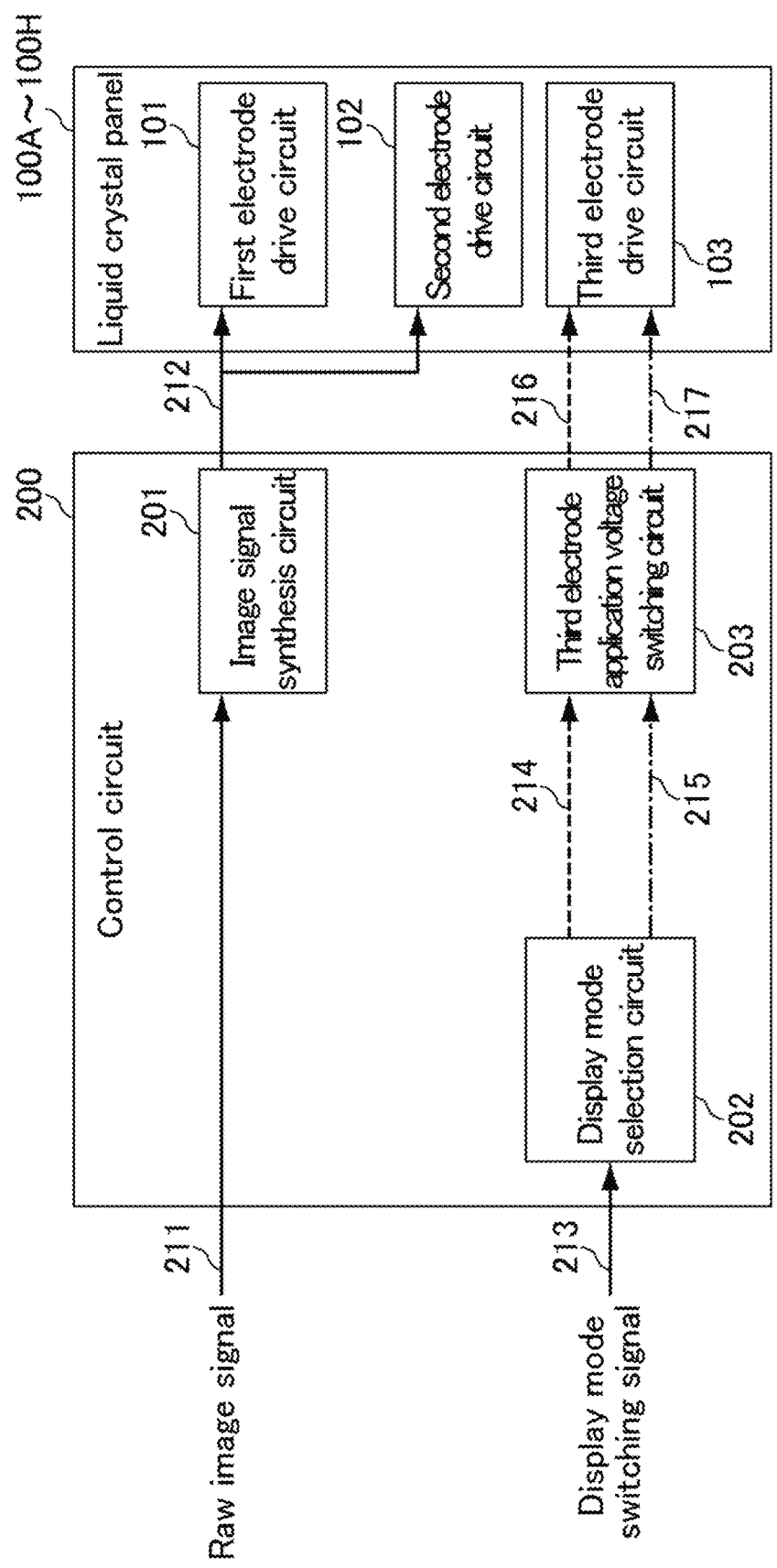
FIG. 15 is a block diagram schematically showing a display method in the first display mode and the second display mode in Embodiment 5.

FIG. 15 is a block diagram schematically showing a display method in the first display mode and the second display mode in Embodiment 5. As shown in FIG. 15, the liquid crystal display device of Embodiment 3 includes a liquid crystal panel and a control circuit 200. The liquid crystal panel may be any one of the liquid crystal panels 100A to 100H described in Embodiments 1 to 4.

The liquid crystal panel may include a first electrode drive circuit 101 that applies voltage to the first electrode 12, a second electrode drive circuit 102 that applies voltage to the second electrodes 14, and a third electrode drive circuit 103 that applies voltage to the third electrode 34. The control circuit 200 may include an image signal synthesis circuit 201, a display mode selection circuit 202, and a third electrode application voltage switching circuit 203.

The control circuit 200 applies driving voltage to the third electrode 34 in the first display mode (privacy mode) and applies constant voltage to the third electrode 34 in the second display mode (public mode). The constant voltage is alternating voltage and can be set to a certain voltage regardless of the magnitude of impedance of the third electrode 34. The constant voltage to the third electrode 34 is regarded as common voltage to determine the voltage (alternating voltage) to be applied to the first electrode 12 and the second electrode 14. With the constant voltage taken as the common voltage Vcom=0 V, for example, application of Vcom voltage to the first electrode 12 and alternating voltage of Vcom±α[V] (wherein α is a voltage of 0 V or higher at a frequency of 60 Hz) as the driving voltage to the second electrodes 14 generates between the first electrode 12 and the second electrodes 14 a fringe electric field whose direction is reversed with 60-Hz intervals.

In the privacy mode of the liquid crystal panel, the driving voltage applied to the third electrode 34 is alternating voltage with a greater effective value than the constant voltage. Application of alternating voltage to the third electrode 34 enables generation of a vertical electric field with the first electrode 12 (or second electrodes 14) to which the common voltage is applied. The driving voltage may be, for example, alternating voltage with a greater effective value than the constant voltage by 3 to 7.5 V. In addition, for reduction or prevention of a phenomenon that an afterimage of the displayed image remains (i.e., image sticking) in the privacy mode, the driving voltage to be applied to the third electrode 34 is preferably alternating voltage of Vcom±α[V] (wherein α is a voltage of 0 V or higher at a frequency of 120 Hz). This suggests that the frequency f1 [Hz] of the driving voltage applied to the second electrodes 14 and the frequency f2 [Hz] of the driving voltage applied to the third electrode 34 are in the relationship: 2×f1=f2.

Constant voltage is applied to the fourth electrode 36. The constant voltage applied to the fourth electrode 36 is alternating voltage and can be set to a certain voltage regardless of the magnitude of impedance of the fourth electrode 36. The constant voltage applied to the fourth electrode 36 is preferably a common voltage Vcom which is the same as the constant voltage applied to the third electrode 34 in the privacy mode. The fourth electrode 36 may be, for example, electrically connected to an electrode to which the common voltage Vcom is applied in the active matrix substrate 10.

The image signal synthesis circuit 201, for example, receives a raw image signal 211 for displaying a desired image and outputs an image signal 212 corresponding to the received raw image signal 211 to the first electrode drive circuit 101 and the second electrode drive circuit 102.

The display mode selection circuit 202 receives a display mode switching signal 213 for switching between the first display mode and the second display mode. When the first display mode is selected, the display mode selection circuit 202 outputs a first display mode selection signal 214 to the third electrode application voltage switching circuit 203. When the second display mode is selected, the display mode selection circuit 202 outputs a second display mode selection signal 215 to the third electrode application voltage switching circuit 203.

The third electrode application voltage switching circuit 203 inputs a driving voltage signal 216 or a constant voltage signal 217 to the third electrode drive circuit 103 according to the received display mode selection signal so as to switch between application of alternating voltage and application of constant voltage to the third electrode 34. When receiving a first display mode selection signal 214 from the display mode selection circuit 202, the third electrode application voltage switching circuit 203 outputs a driving voltage signal 216 to the third electrode drive circuit 103 so as to apply a predetermined alternating voltage to the third electrode 34. When receiving a second display mode selection signal 215 from the display mode selection circuit 202, the third electrode application voltage switching circuit 203 outputs a constant voltage signal 217 to the third electrode drive circuit 103 so as to apply a predetermined constant voltage to the third electrode 34.

(Display Method)

An example of the display method of the first display mode and the second display mode is described. The liquid crystal molecules align in the direction horizontal to the active matrix substrate 10 with no voltage applied to the liquid crystal layer. The term "horizontal" herein means that the tilt angle (including the pre-tilt angle) of the liquid crystal molecules from the surface of the active matrix substrate 10 or the color filter substrate 30 is 0° to 5°, preferably 0° to 3°, more preferably 0° to 1°. The tilt angle of the liquid crystal molecules means an angle of the major axes of the liquid crystal molecules formed with the surface of the active matrix substrate 10.

In black display in the public mode, the control circuit 200 applies a predetermined alternating voltage as the constant voltage to the third electrode 34. The control circuit 200 applies common voltage which is common to the constant voltage to the second electrodes 14, the first electrode 12 and the fourth electrode 36, with the constant voltage set at 0 V. The common voltage to be applied to the second electrodes 14, the first electrode 12, and the fourth electrode 36 may be the same as the constant voltage or a voltage lower than the threshold of the liquid crystal molecules relative to the constant voltage may be applied. This state is also referred to as a state with no voltage applied. With no voltage applied, no electric field is generated that drives liquid crystal molecules in the liquid crystal layer 20, and thus the liquid crystal molecules align at the initial alignment azimuth. This means that the alignment azimuth of the liquid crystal molecules does not vary in the plane of the liquid crystal layer 20, so that the liquid crystal panel does not transmit light from the back surface to provide black display. The black display is the display state with the lowest luminance (grayscale value of 0). The white display is the display state with the highest luminance (grayscale value of 255). The initial alignment azimuth is preferably parallel to the active matrix substrate 10 and, in a plan view, parallel to the absorption axis 61A of the first polarizing plate 61 or the absorption axis 62A of the second polarizing plate 62.

In white display in the public mode, for example, the control circuit, with the constant voltage applied to the third electrode 34, applies constant voltage (common voltage) to one of the first electrode 12 and the second electrodes 14 as well as the fourth electrode 36 and alternating voltage with a different effective value from the common voltage to the other. Fringe electric fields are generated between the first electrode 12 and the second electrodes 14, while the electric fields in the thickness direction of the liquid crystal layer 20 are weak unlike in the later-described privacy mode. Thus, the alignment azimuth varies while the liquid crystal molecules align parallel to the active matrix substrate 10 due to the electric fields generated between the first electrode 12 and the second electrodes 14. With the alignment azimuth varying from the initial alignment azimuth as the liquid crystal molecules rotate in the plane of the liquid crystal layer 20, the major axes of the liquid crystal molecules form an angle with the absorption axis 61A of the first polarizing plate or the absorption axis 62A of the second polarizing plate to transmit light from the back surface of the liquid crystal panel. This provides white display.

In black display in the privacy mode, the control circuit applies driving voltage with a different effective value from the constant voltage to the third electrode, and applies constant voltage (common voltage) to the second electrodes 14, the first electrode 12, and the fourth electrode 36. Oblique electric fields are generated between the third electrode 34 and the first electrode 12 and between the third electrode 34 and the electrodes including the first electrode 12 and the second electrodes 14. The liquid crystal molecules form an angle with the active matrix substrate 10 due to the oblique electric fields.

Since the alignment azimuth of the liquid crystal molecules does not vary in the plane of the liquid crystal layer 20, the liquid crystal panel does not transmit light from the back surface. Meanwhile, since the liquid crystal molecules are at an angle from the active matrix substrate, the black display of the liquid crystal panel when observed in the wide viewing angle range outside the narrow viewing angle range appears to be more whitish than when observed in the narrow viewing angle range.

In white display in the privacy mode, the control circuit 200, with driving voltage applied to the third electrode 34, applies constant voltage (common voltage) to one of the first electrode 12 and the second electrodes 14 as well as the fourth electrode 36 and applies alternating voltage with a different effective value from the common voltage to the other. The driving voltage applied to the third electrode 34 is preferably different from the alternating voltage applied to the first electrode 12 or the second electrodes 14 in effective value, more preferably higher than the alternating voltage applied to the first electrode 12 and the second electrodes 14 in effective value.

The driving voltage applied to the third electrode 34 and the alternating voltage applied to the first electrode 12 or the second electrodes 14 may be different in frequency. The frequency of the driving voltage may be higher than the frequency of the alternating voltage applied to the first electrode 12 or the second electrodes 14. The frequency of the driving voltage may be 60 Hz or 120 Hz, while the frequency of the alternating voltage applied to the first electrode 12 or the second electrodes 14 may be 60 Hz. With a frequency of the driving voltage set at 120 Hz, flicker can be reduced.

Fringe electric fields are generated between the first electrode 12 and the second electrode 14, while electric fields oblique to the thickness direction of the liquid crystal layer 20 are generated between the third electrode 34 and the first electrode 12 or between the third electrode 34 and the second electrodes 14. As a result, electric fields synthesized from the fringe electric fields and the oblique electric fields are generated in the liquid crystal layer 20. The electric fields generated among the first electrode 12, the second electrodes 14, and the third electrode 34 cause the liquid crystal molecules to form an angle with the active matrix substrate 10 while varying the alignment azimuth, thus providing white display. Since the liquid crystal molecules form an angle with the active matrix substrate, the first image can be observed in the narrow viewing angle range, while the first image is less observable when the liquid crystal panel is observed in the wide viewing angle range outside the narrow viewing angle range as a result of changes in the image such as a significant decrease in contrast ratio.

In the privacy mode, grayscale display is provided while constant voltage is applied to the third electrode 34 as described above. In a conventional liquid crystal display device, when voltage is applied to an electrode (the third electrode in the present embodiment) in the color filter substrate, the black matrix in the color filter substrate is sometimes charged to generate an electric field neither parallel nor perpendicular to the absorption axes of the polarizing plates in a plan view between the charged black matrix and the electrodes in the active matrix substrate. This electric field neither parallel nor perpendicular to the absorption axes of the polarizing plates shifts the major axes (director) of the liquid crystal molecules off the absorption axes of the polarizing plates, so that the liquid crystal molecules may be misaligned and light leakage (decrease in black level) may occur when the liquid crystal panel is observed from the front in black display. This may decrease the front contrast ratio in the privacy mode. In Embodiments 1 to 4, the fourth electrode 36 is disposed between the third electrode 34 and the black matrix 33 and the constant voltage is applied to the fourth electrode 36. This configuration can block generation of an electric field between the third electrode 34 and the black matrix 33 to prevent the black matrix from being charged, whereby occurrence of light leakage can be prevented.

The white display in the privacy mode and white display in the public mode can be switched by applying voltage to the third electrode. Similarly, the black display in the privacy mode and the black display in the public mode can be switched by applying voltage to the third electrode. The same applies to grayscale display.

The liquid crystal display device of the present embodiment, as described above, can achieve a high level of privacy protection when the liquid crystal panel is observed from the horizontal direction by switching the mode from the second display mode (public mode) to the first display mode (privacy mode). The horizontal direction is the direction at an azimuth of 0° and an azimuth of 180° when the direction to the right of the liquid crystal panel displaying a desired image is 0° and the angle increases counterclockwise.

(Veil-View Display)

Figure 16:
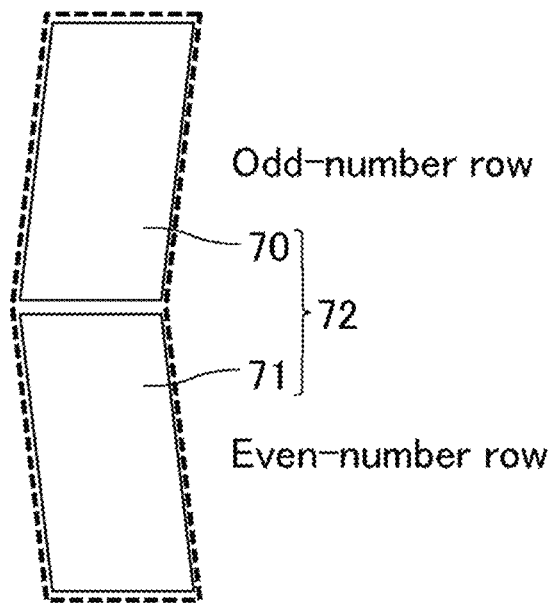
FIG. 16 is a schematic plan view showing an example of a single display unit in the liquid crystal panel.
Figure 17:
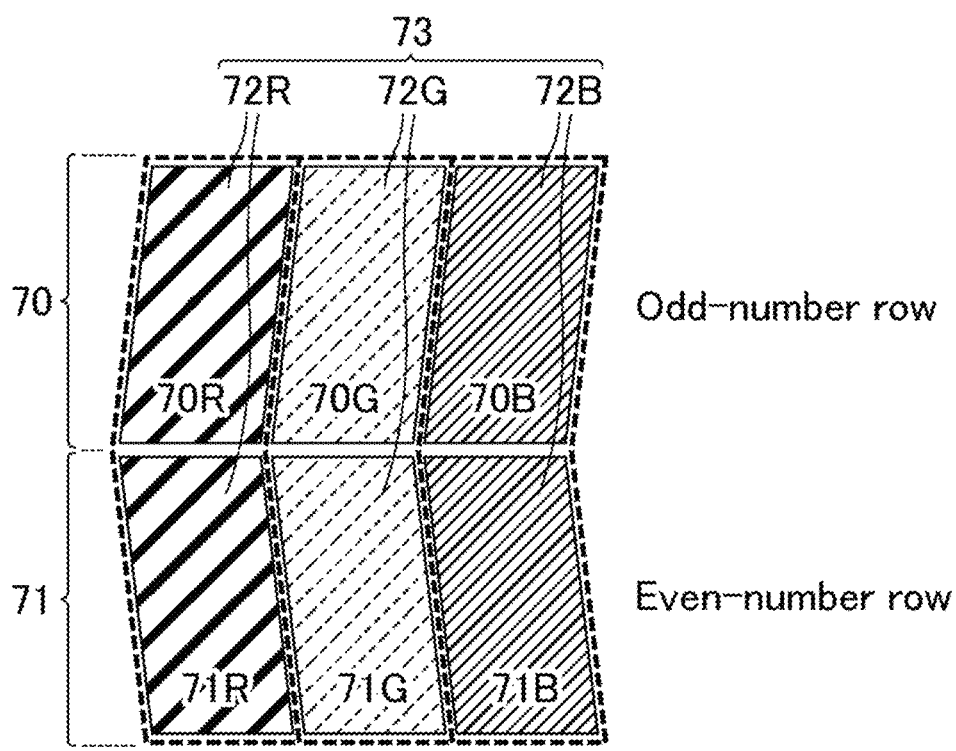
FIG. 17 is a schematic plan view showing an example of a color element for providing color display using a soft veil-view function.
Figure 18:
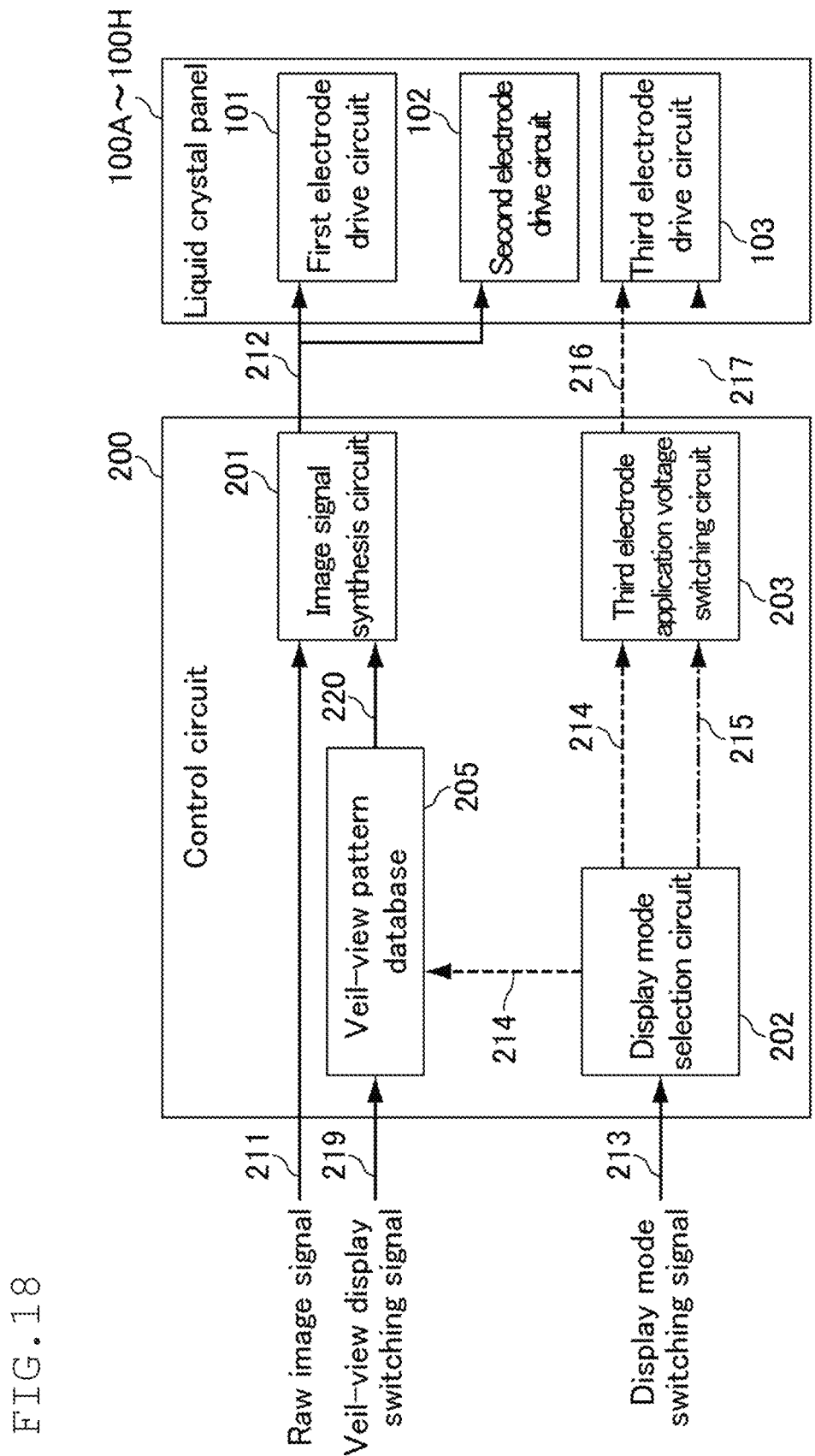
FIG. 18 is a block diagram schematically showing a display method for displaying a veil-view pattern in Embodiment 5.

The switching of the display modes may be combined with the later-described soft veil-view function. The soft veil-view function utilizes software to display a given veil-view pattern. For example, software may drive the control circuit to display a veil-view pattern. The following shows an example of a method of displaying an image by the soft veil-view function with reference to FIG. 16 to FIG. 18. FIG. 16 is a schematic plan view showing an example of a single display unit in the liquid crystal panel. FIG. 17 is a schematic plan view showing an example of a color element for providing color display using a soft veil-view function. FIG. 18 is a block diagram schematically showing a display method for displaying a veil-view pattern in Embodiment 5.

As shown in FIG. 16, the liquid crystal panels 100A to 100H (hereinafter, simply referred to as the liquid crystal panel) include display units 72 which utilize the soft veil-view function to display an image. The display units 72 each include a pair of sub-pixels arranged adjacent to each other, one of the sub-pixels being a first sub-pixel 70 selected from an odd-number row and the other being a second sub-pixel 71 selected from an even-number row. The first pixel 70 and the second pixel 71 may each be considered as one sub-pixel as shown in FIG. 1, or a combination of a first red sub-pixel 70R, a first green sub-pixel 70G, and a first blue sub-pixel 70B may be regarded as the first pixel 70 and a combination of a second red sub-pixel 71R, a second green sub-pixel 71G, and a second blue sub-pixel 71B may be regarded as the second sub-pixel 71 as shown in FIG. 17. For color display by an ordinary display method, the pixels including red, green, and blue pixels are independently driven. In the ordinary color display, the display can be at a resolution twice that of the color display using the soft veil-view function.

For color display, the liquid crystal panel preferably includes a red display unit 72R including a first red sub-pixel 70R and a second red sub-pixel 71R, a green display unit 72G including a first green sub-pixel 70G and a second green sub-pixel 71G, and a blue display unit 72B including a first blue sub-pixel 70B and a second blue sub-pixel 71B. Each color element 73 may include a red display unit 72R, a green display unit 72G, and a blue display unit 72B. The first red sub-pixel 70R and the second red sub-pixel 71R each coincide with a red color filter 32R in an optical opening. The first green sub-pixel 70G and the second green sub-pixel 71G each coincide with a green color filter 32G in an optical opening. The first blue sub-pixel 70B and the second blue sub-pixel 71B each coincide with a blue color filter 32B in an optical opening.

An image can be displayed using the soft veil-view function by, for example, dividing the luminance data value of the raw image desired to be displayed as a first image, Data 1, into two equivalent data values Data 2 and Data 3, inputting the data value of Data 1+Data 2 to the first sub-pixel 70 or the second sub-pixel 71, and inputting the data value of Data 1−Data 3 to the other. When the liquid crystal panel is observed in the narrow viewing angle range, the luminance of the first sub-pixel 70 and the luminance of the second sub-pixel 71 are spatially averaged to be recognized as the luminance of the raw image. Meanwhile, when the panel is observed in the wide viewing angle range outside the narrow viewing angle range, the luminance values are recognized as the luminance Data 1+Data 2 or the luminance Data 1−Data 3.

Hereinafter, the method of displaying a veil-view pattern is described with reference to FIG. 18. The control circuit 200 in the first display mode inputs different image signals to the first sub-pixel and the second sub-pixel such that a second image different from the first image is observed in the wide viewing angle range outside the narrow viewing angle range. Such a display method is also referred to as the soft veil-view function. Display using the soft veil-view function can further enhance the privacy when combined with the first display mode (privacy mode). Thus, when receiving a first display mode selection signal 214 from the display mode selection circuit 202, a database 205 preferably outputs a veil-view pattern image signal 220 to the image signal synthesis circuit 201.

As shown in FIG. 18, the control circuit 200 may further include the database 205 in which information related to the veil-view patterns is stored. When receiving a veil-view display switching signal 219, the database 205 outputs a veil-view pattern image signal 220 to the image signal synthesis circuit 201. The image signal synthesis circuit 201 outputs an image signal 212 formed by synthesis of the raw image signal 211 and the veil-view pattern image signal 220 to the first electrode drive circuit 101 and the second electrode drive circuit 102.

For example, when the second electrode drive circuit 102 applies common voltage to the second electrodes 14, the first electrode drive circuit 101 applies different voltages to the first electrode(s) 12 corresponding to the first sub-pixel 70 and the second sub-pixel 71 such that the second image is observed in the wide viewing angle range outside the narrow viewing angle range. In this case, one first electrode 12 is preferably provided in each sub-pixel. When the first electrode drive circuit 101 applies common voltage to the first electrode 12, the second electrode drive circuit 102 applies different voltages to the second electrodes 14 corresponding to the first sub-pixel 70 and the second sub-pixel 71 such that the second image is observed in the wide viewing angle range outside the narrow viewing angle range.

The second image is preferably a veil-view pattern. The veil-view pattern is a display image that is to be superimposed with the first image to make the first image less perceivable. Displaying the veil-view pattern further enhances the privacy. The veil-view pattern is not limited, and may be a geometric pattern such as a striped pattern or a checkered pattern, characters, or an image.

Embodiment 6

A liquid crystal display device of Embodiment 6 includes a backlight behind the back surface of the liquid crystal panel. The backlight includes light sources, and a shading louver closer to the liquid crystal panel than the light sources are. The control circuit controls the luminance of the backlight to be lower in the first display mode than in the second display mode. The liquid crystal panel may be any one of the liquid crystal panels 100A to 100H described in Embodiments 1 to 4.

In Embodiment 6, the backlight used includes light sources and a shading louver closer to the liquid crystal panel than the light sources are. With such a backlight including a shading louver, the luminance in the normal direction is relatively increased and thus the directive property of the backlight is enhanced. The backlight including a shading louver can be a known one. For example, the backlight disclosed in JP 2002-124112 A may be used.

Figure 19:
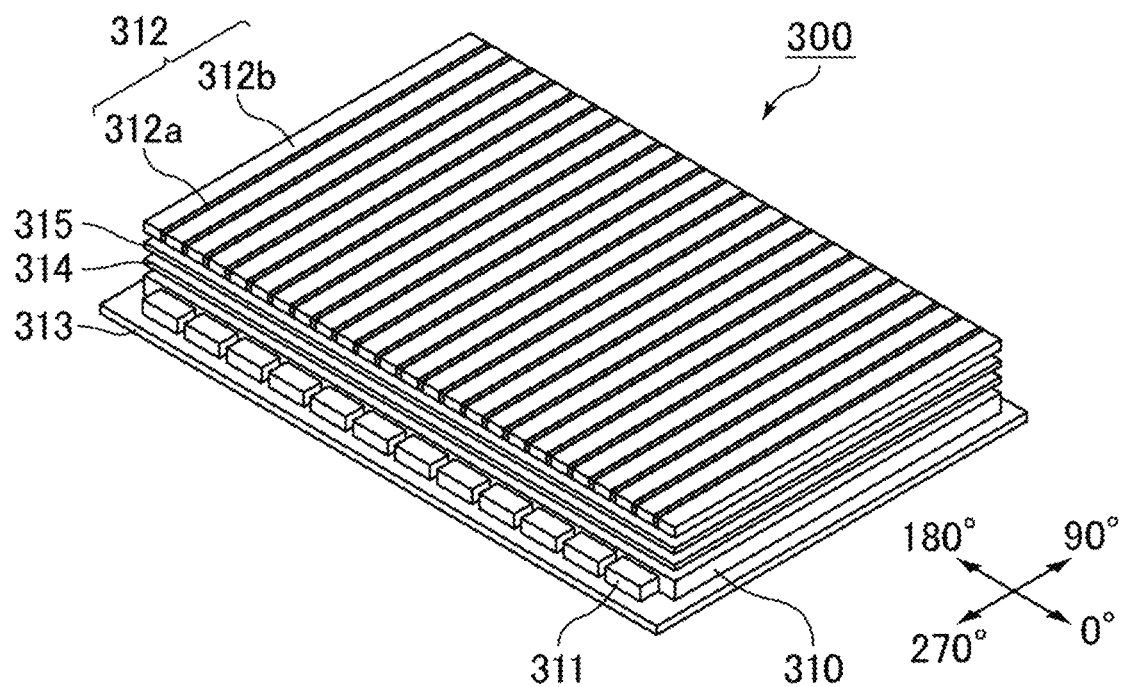
FIG. 19 is an exploded perspective view schematically showing a backlight including a shading louver in Embodiment 6.

FIG. 19 is an exploded perspective view schematically showing a backlight including a shading louver in Embodiment 6. The backlight including a shading louver may be an edge-lit backlight, and may include, for example, as shown in FIG. 19, a light guide plate 310, light sources 311 on a side surface of the light guide plate 310, and a shading louver 312 on or in front of the light guide plate 310 (between the light guide plate 310 and the liquid crystal panel). A reflection sheet 313 may be disposed on the back surface of the light guide plate 310, and components such as a prism sheet 314 and a diffusion sheet 315 may be disposed between the light guide plate 310 and the shading louver 312. The light sources 311 are disposed on at least one of the opposing side surfaces of the light guide plate 310, and may be disposed on both side surfaces. FIG. 17 shows an example in which the light sources 311 are disposed along a 0°-180° azimuth side of the liquid crystal panel, but may be disposed along a 90°-270° azimuth side of the liquid crystal panel.

The shading louver 312 preferably blocks light incident thereon from the light guide plate depending on the angle of incidence. Examples of the shading louver include one disclosed in JP 2002-124112 A alternately including light transmitting layers 312a that transmit light and light absorbing layers 312b that absorb light at certain intervals. The intervals at which the light transmitting layers 312a and the light absorbing layers 312b are disposed may be, for example, 100 μm to 150 μm. The light transmitting layers 312a and the light absorbing layers 312b in a plan view may be disposed linearly. The extending direction of the light transmitting layers 312a and the light absorbing layers 312b preferably form an angle of 0° to 10° with the 90°-270° azimuth of the liquid crystal panel, and may be parallel to (form an angle of 0° with) the 90°-270° azimuth. The light transmitting layers 312a may be formed from a resin transparent to light, for example. The light absorbing layers 312b may be formed from a resin containing a black pigment or dye. The total light transmittance of the light absorbing layers 312b is preferably, for example, 5% or lower. The total light transmittance of the light transmitting layers 312a is preferably 80% or higher.

Figure 20:
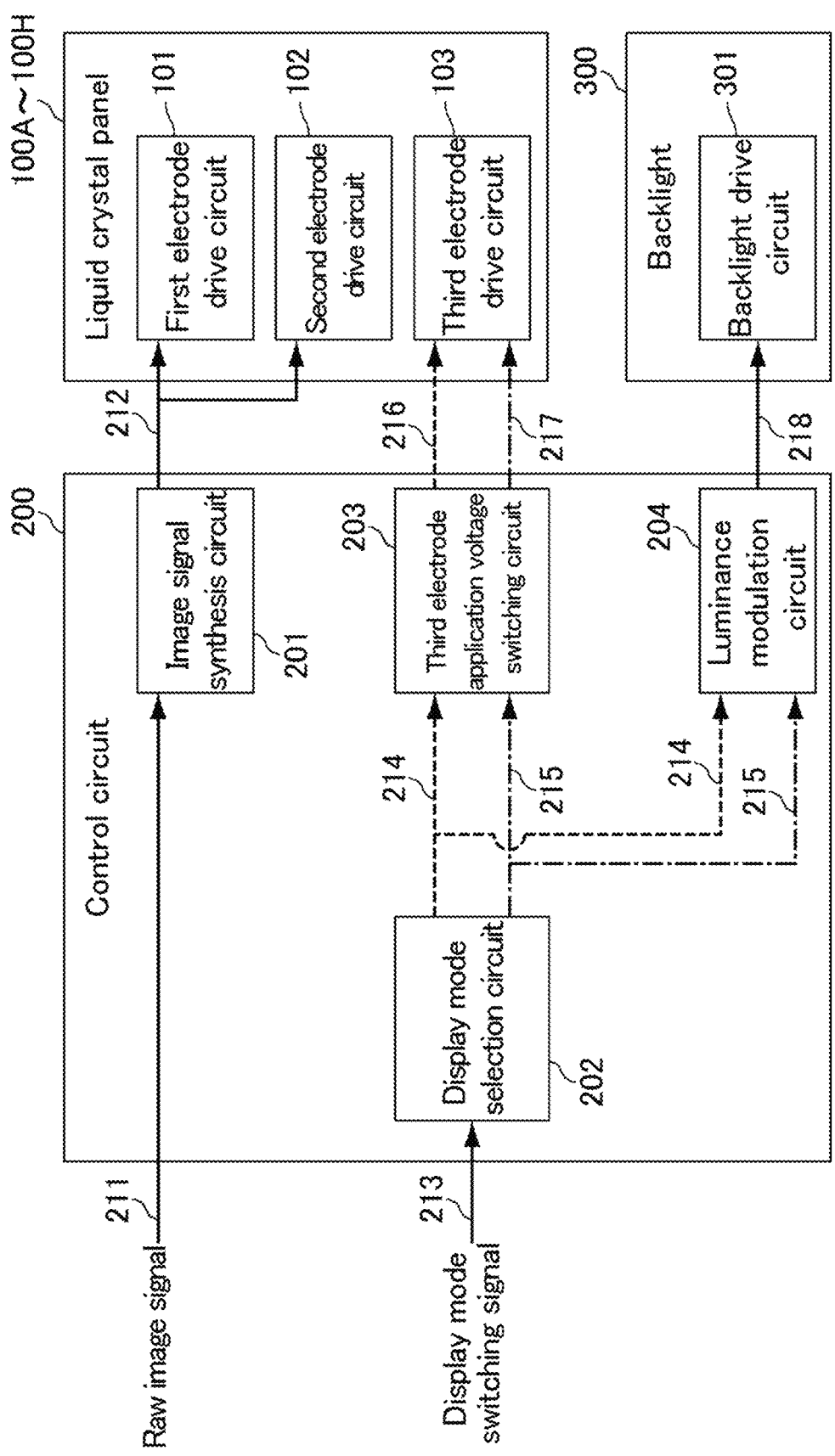
FIG. 20 is a block diagram schematically showing a method for providing display in the first display mode and the second display mode in Embodiment 6.
Figure 21:
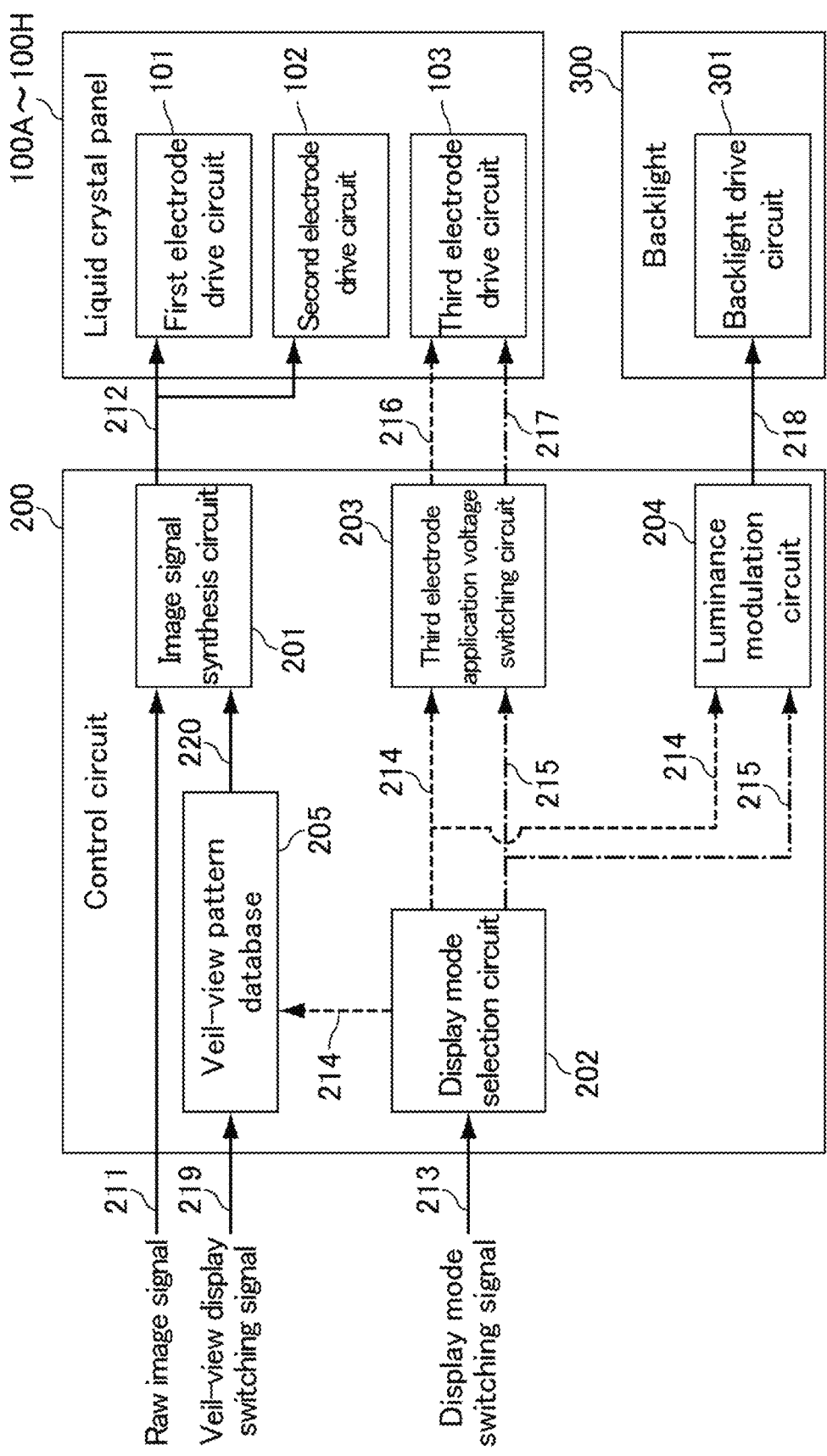
FIG. 21 is a block diagram schematically showing a method for displaying a veil-view pattern in Embodiment 6.

The liquid crystal display device of Embodiment 6 can more effectively enhance the privacy in the privacy mode when the luminance of its backlight is synchronized with the display mode. FIG. 20 is a block diagram schematically showing a method for providing display in the first display mode and the second display mode in Embodiment 6. FIG. 21 is a block diagram schematically showing a method for displaying a veil-view pattern in Embodiment 6.

The control circuit 200 controls the luminance of the backlight 300 to be lower in the first display mode than in the second display mode. As shown in FIG. 20 and FIG. 21, the control circuit 200 may further include a luminance modulation circuit 204 for the backlight. The backlight 300 may include a backlight drive circuit 301.

When receiving a first display mode selection signal 214 from the display mode selection circuit 202, the luminance modulation circuit 204 outputs a luminance modulation signal 218 to the backlight drive circuit 301 to adjust the luminance of the backlight 300 low. When receiving a second display mode selection signal 215 from the display mode selection circuit 202, the luminance modulation circuit 204 outputs a luminance modulation signal 218 to the backlight drive circuit 301 to adjust the luminance of the backlight 300 high.

The luminance of the backlight 300 may be adjusted such that the luminance of the liquid crystal panel in white display in observation from the normal direction is, for example, 100 to 300 nit in the first display mode and 300 to 500 nit in the second display mode.

EXAMPLES

Hereinafter, the effect of the present invention is described with reference to examples and comparative examples. The present invention is not limited to these examples. In the following examples and comparative examples, the voltage applied to the third electrode is taken as the counter voltage (Vc).

<Examination of Switching Between Display Modes and Shield Effect>

In the following Examples 1 to 3 and Comparative Example 1, whether the privacy mode and the public mode can be switched was tested. Also, light leakage was simulated to determine whether charging of the black matrix was reduced or prevented.

Example 1

Example 1 is a specific example of Embodiment 1, and the liquid crystal panel used in Example 1 has the same configuration as the liquid crystal panel 100A in FIG. 1 to FIG. 3. The active matrix substrate 10 had an FFS electrode structure. The first electrode 12 was a solid electrode with no opening. The second electrodes 14 were arranged in the respective sub-pixels and each had an electrode structure including two first linear electrodes 14a with a width of 2.5 μm and provided with the openings 14b with a width of 3.5 μm between adjacent first linear electrodes 14a. The liquid crystal molecules were of a positive liquid crystal material. The color filter substrate 30 included a color filter layer with a thickness of 2.3 μm, the first dielectric layer 50 with a thickness of 2 μm, the second dielectric layer 35 with a thickness of 1.3 μm, and the first dielectric layer 50 with a thickness of 2 μm. The extension direction (first direction D1) of the first linear electrodes 14a and the extension direction (second direction D2) of the second linear electrodes 34a of the third electrode formed an angle θ1 of 80°. The third electrode 34 included the second linear electrodes 34a, and the width of each second linear electrode 34a was 40 μm. The fourth electrode 36 was a solid electrode with no opening.

The first electrode 12, the second electrodes 14, the third electrode 34, and the fourth electrode 36 can be made of ITO. For example, the first insulating layer 13 can be made of silicon oxide and the second dielectric layer 35 and the first dielectric layer 50 can be made of an acrylic resin. The black matrix can be one that is made of a black resin and has a resistivity of $1.0 \times 10^{10}$ to $1.0 \times 10^{13}$ (Ω·cm).

Example 2

The liquid crystal panel of Example 2 has the same configuration as in Example 1, except that the thickness of the second dielectric layer 35 in Example 1 was changed to 4 μm.

Example 3

Example 3 is a specific example of Embodiment 3 and a liquid crystal panel of Example 3 has the same configuration as the liquid crystal panel 100F in FIG. 10. The liquid crystal panel of Example 3 has the same configuration as in Example 1, except that the color filter substrate includes the fourth electrode 36 between the black matrix 33 and the color filter layer. The thickness of the color filter layer was 2.3 μm, the thickness of the second dielectric layer 35 was 1.3 μm, and the thickness of the third dielectric layer 51 was 2 μm. The third dielectric layer 51 can be made of the same material as the first dielectric layer 50.

Comparative Example 1

Figure 22:
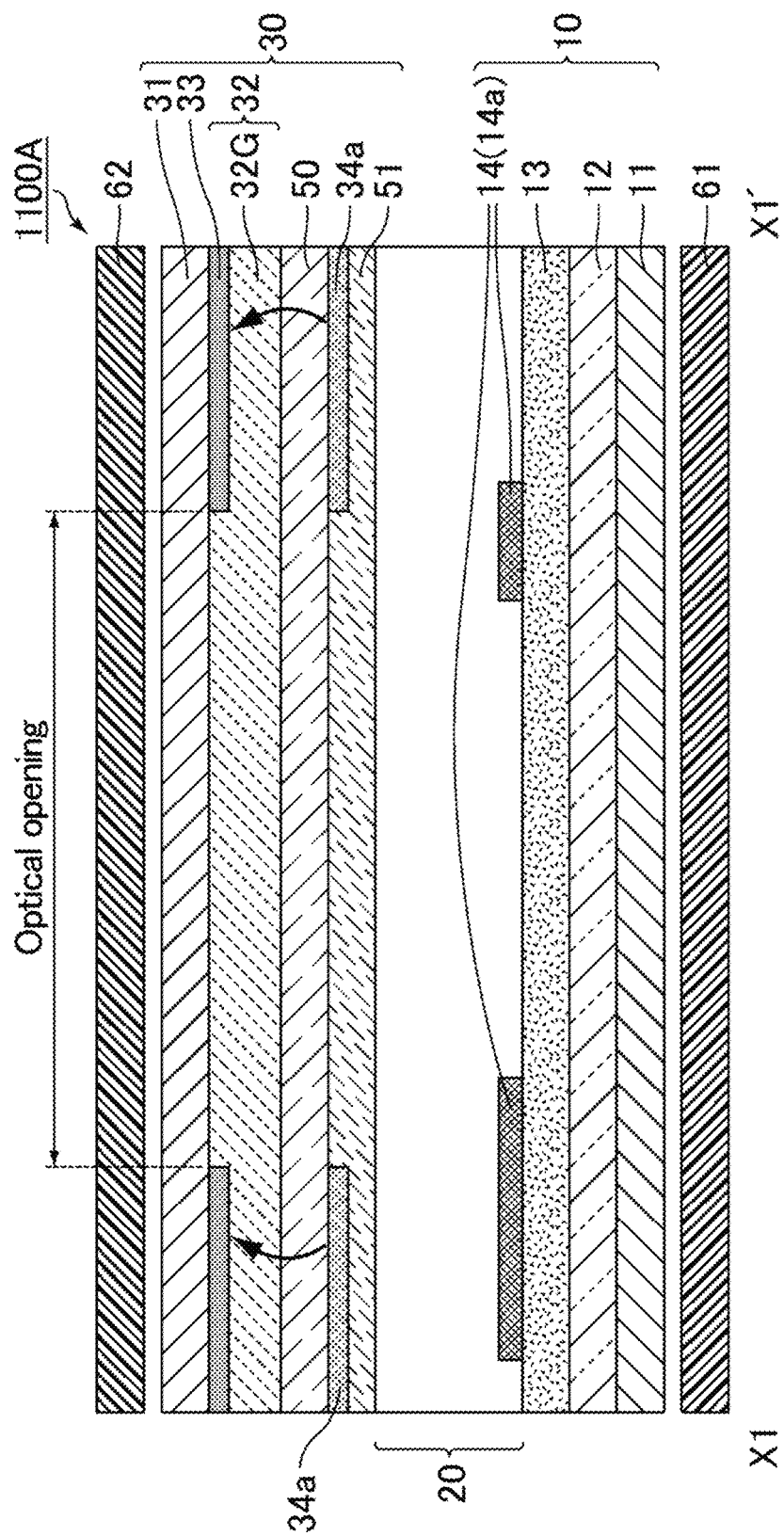
FIG. 22 is a schematic cross-sectional view of a liquid crystal panel of Comparative Example 1.

FIG. 22 is a schematic cross-sectional view of a liquid crystal panel of Comparative Example 1. As shown in FIG. 22, a color filter substrate 30 in a liquid crystal panel 1100A of Comparative Example 1 sequentially included a second substrate 31, a black matrix 33, color filters 32 (32G), a first dielectric layer 50, a third electrode 34 (34a), and a third dielectric layer 51. The liquid crystal panel 1100A of Comparative Example 1 included no electrode corresponding to the fourth electrode in Example 1 between the black matrix and the third electrode. The shape of the third electrode 34 (34a) was the same as in Example 1.

The front contrast ratios and the contrast ratios at a polar angle of 45° were simulated in Examples 1 to 3 and Comparative Example 1 by varying the counter voltage Vc applied to the third electrode between 0 V to 10 V. The front contrast ratios and the contrast ratios at a polar angle of 45° were calculated by the following method. For black display, the common voltage Vcom applied to the first electrode, the second electrodes, and the fourth electrode was 0 V. For white display, the voltage (alternating voltage) applied to the first electrode was 6.5 V and the voltage applied to the second electrodes was 0 V.

The luminance values in black display (grayscale value of 0) and white display (grayscale value of 255) when the liquid crystal panel was observed from the normal direction (front) and from a polar angle of 45° were measured. The following formula (1) was used to calculate the contrast ratio when the liquid crystal panel was observed from the front (front contrast ratio) and the contrast ratio when the liquid crystal panel was observed from an azimuth of 0° or 180° at a polar angle of 45° (contrast ratio at a polar angle of 45°). The "SR-UL1R" available from Topcon Technohouse Corporation was used to measure the luminance values.

CR=luminance in white display (grayscale value of 255)/luminance in black display (grayscale value of 0)  (1)

The transmittance from the front in a sub-pixel in black display in the privacy mode was simulated. An LCD Master 3D (available from SHINTECH) was used to simulate the transmittance. The common voltage Vcom applied to the first electrode, the second electrodes, and the fourth electrode was 0 V, while the counter voltage Vc applied to the third electrode was 10 V. In the simulation views, a dark-colored portion indicates a low transmittance, and a white portion indicates a high transmittance.

Figure 23:
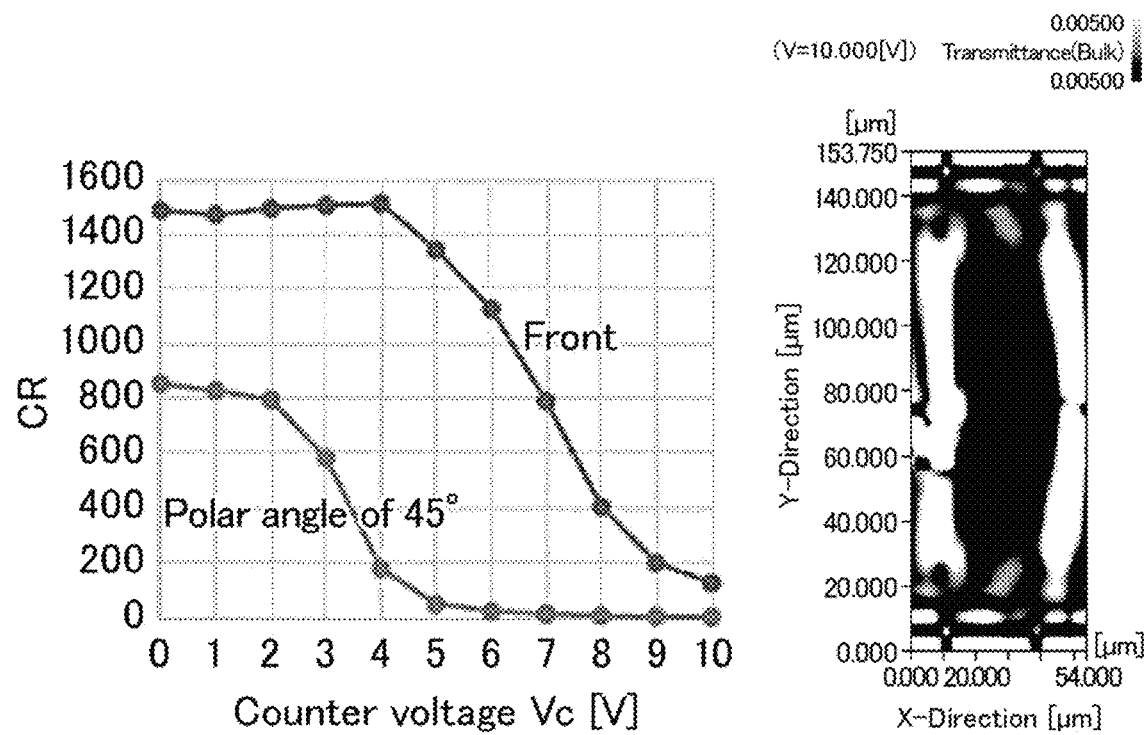
FIG. 23 shows a graph of the contrast ratios and the simulation result of the transmittance in a sub-pixel in Comparative Example 1.

FIG. 23 shows a graph of the contrast ratios and the simulation result of the transmittance in a sub-pixel in Comparative Example 1. The simulation result in FIG. 23 shows light leakage in a wide range in a pattern surrounding the sub-pixel in Comparative Example 1 when the counter voltage was 10 V. In this state, as shown in the graph in FIG. 23, increasing the counter voltage was found to decrease the front contrast ratio. When the counter voltage was 10 V, the difference between the front contrast ratio and the contrast ratio at a polar angle of 45° was small, with which the privacy mode was presumably difficult to achieve. This is presumably because, as shown in FIG. 22, the black matrix 33 was charged by an electric field (the arrows in FIG. 22) generated between the third electrode 34 and the black matrix 33 when voltage was applied to the third electrode 34 (34a).

Figure 24:
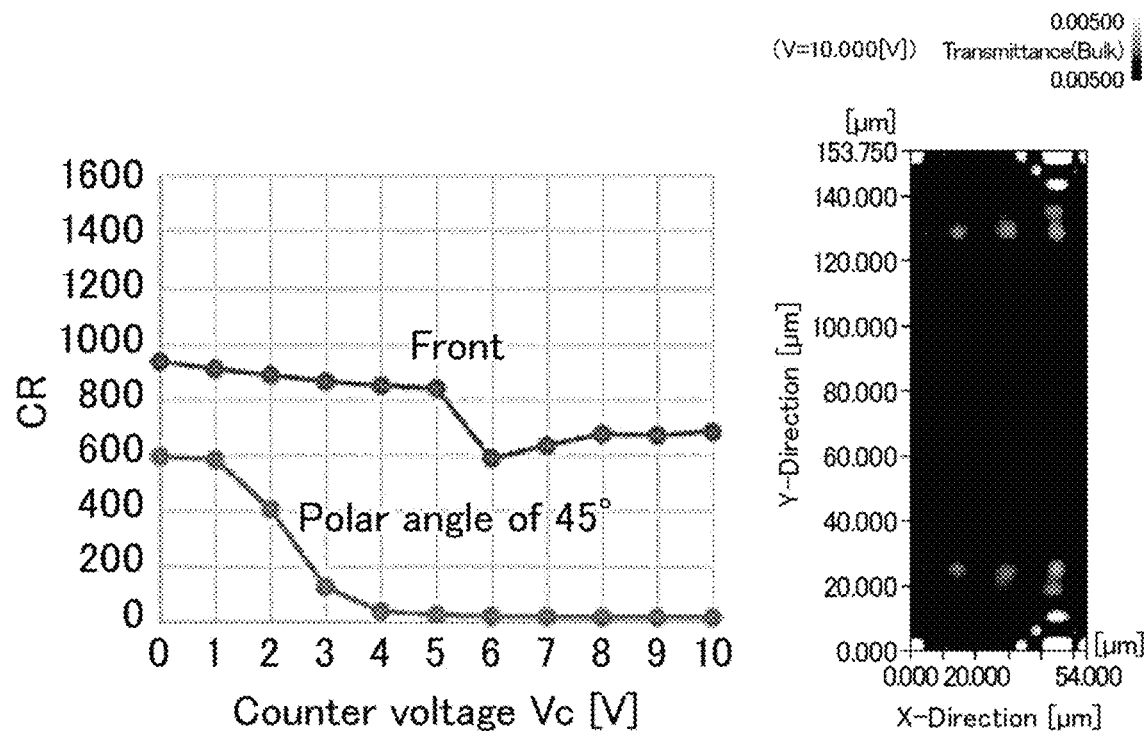
FIG. 24 shows a graph of the contrast ratios and the simulation result of the transmittance in a sub-pixel in Example 1.
Figure 25:
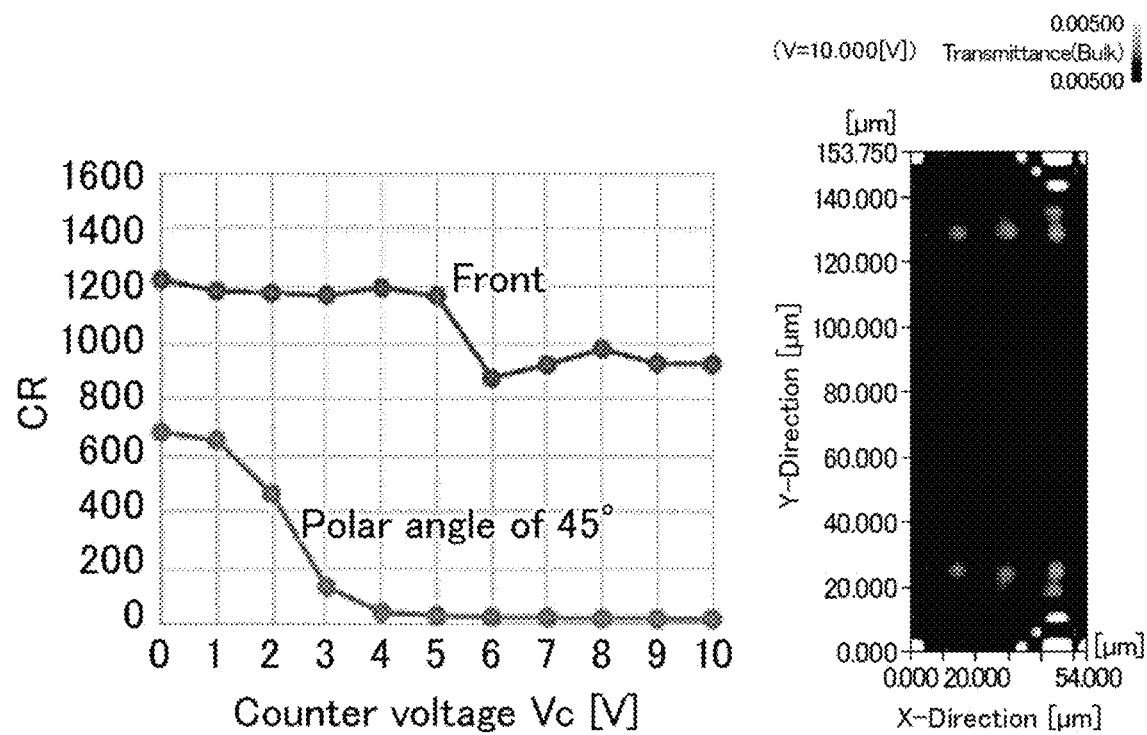
FIG. 25 shows a graph of the contrast ratios and the simulation result of the transmittance in a sub-pixel in Example 2.
Figure 26:
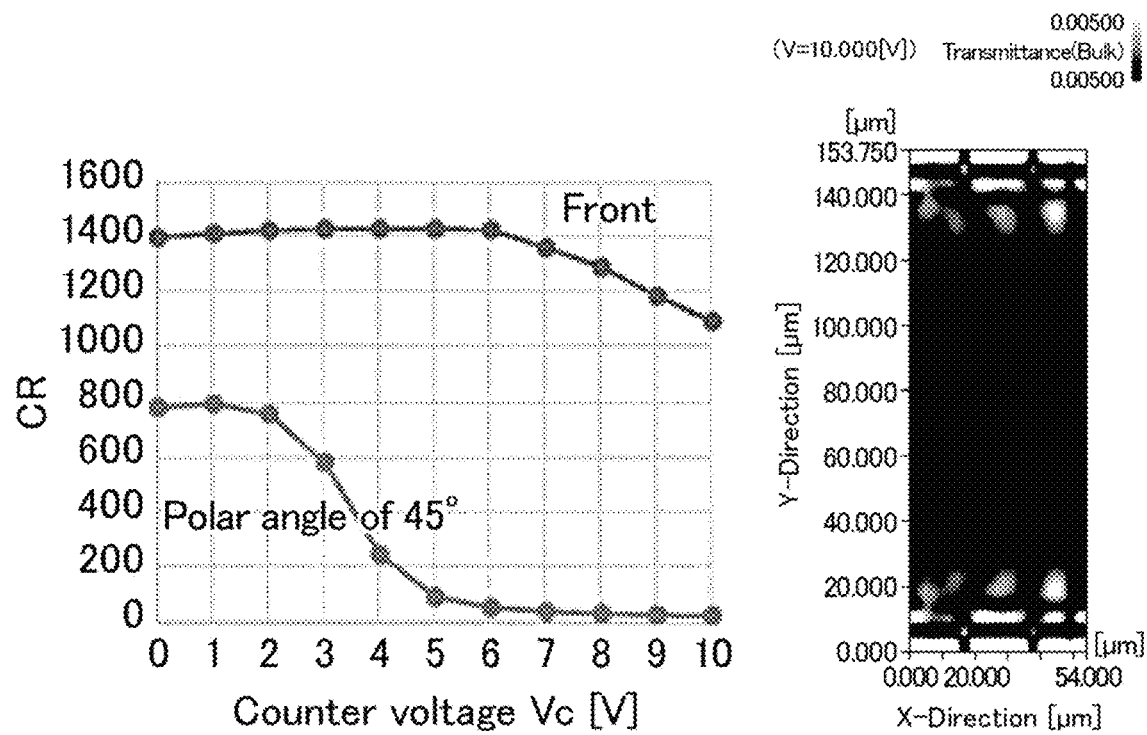
FIG. 26 shows a graph of the contrast ratios and the simulation result of the transmittance in a sub-pixel in Example 3.

FIG. 24 shows a graph of the contrast ratios and the simulation result of the transmittance in a sub-pixel in Example 1. FIG. 25 shows a graph of the contrast ratios and the simulation result of the transmittance in a sub-pixel in Example 2. FIG. 26 shows a graph of the contrast ratios and the simulation result of the transmittance in a sub-pixel in Example 3. The simulation results of transmittance in FIG. 24 to FIG. 26 show that light leakage was reduced in Examples 1 to 3 even when the counter voltage was 10 V. This is presumably because the charging of the black matrix was reduced in Examples 1 to 3 owing to the shield effect of the fourth electrode disposed between the third electrode and the black matrix.

As shown in the graphs in FIG. 24 to FIG. 26, in Examples 1 to 3, a decrease in the front contrast ratio was reduced even when the counter voltage was increased, so that the difference between the front contrast ratio and the contrast ratio at a polar angle of 45° was large enough even when the counter voltage was 10 V. This confirmed that Examples 1 to 3 can achieve switching between the privacy mode and the public mode. In addition, as a result of successful reduction in light leakage, a high front contrast ratio was achieved.

Comparison between the graphs of Example 1 and Example 2 confirmed that in Example 2, the front contrast ratio was successfully maintained high by increasing the thickness of the third dielectric layer while maintaining the contrast ratio equivalent to that in Example 1 in observation from a polar angle of 45°. Example 3 demonstrated a front contrast ratio maintained higher than in Examples 1 and 2 and thus achieved a high shield effect. This is because in Example 3, the distance between the third electrode and the fourth electrode was longest, so that the influence of the fringe electric field acted between the third electrode and the fourth electrode was small.

<Comparison Between Contrast Ratios in Privacy Mode>

The contrast ratios in Examples 1, 4, and 5 and Comparative Example 2 were simulated as described below to compare, in the privacy mode, the contrast ratio when the liquid crystal panel was observed from the normal direction (front contrast ratio) with the contrast ratio when the liquid crystal panel was observed from an azimuth of 0° or 180° at a polar angle of 45° (contrast ratio at a polar angle of 45°).

Example 4

Example 4 is a specific example of Embodiment 2 and a liquid crystal panel of Example 4 has the same configuration as the liquid crystal panel 100C in FIG. 5A, FIG. 5B, and FIG. 6. The liquid crystal panel has the same configuration as in Example 1, except that the third electrode 34 includes one third linear electrode 34b in each sub-pixel. The width of each third linear electrode 34b was 10 μm.

Example 5

Example 5 is a specific example of Embodiment 2 and a liquid crystal panel in Example 5 has the same configuration as the liquid crystal panel 100D in FIG. 7 and FIG. 8. The liquid crystal panel has the same configuration as in Example 1, except that the third electrode 34 includes three third linear electrodes 34b in each sub-pixel. The width of each of the three third linear electrodes 34b was 5 μm.

Comparative Example 2

Figure 27A:
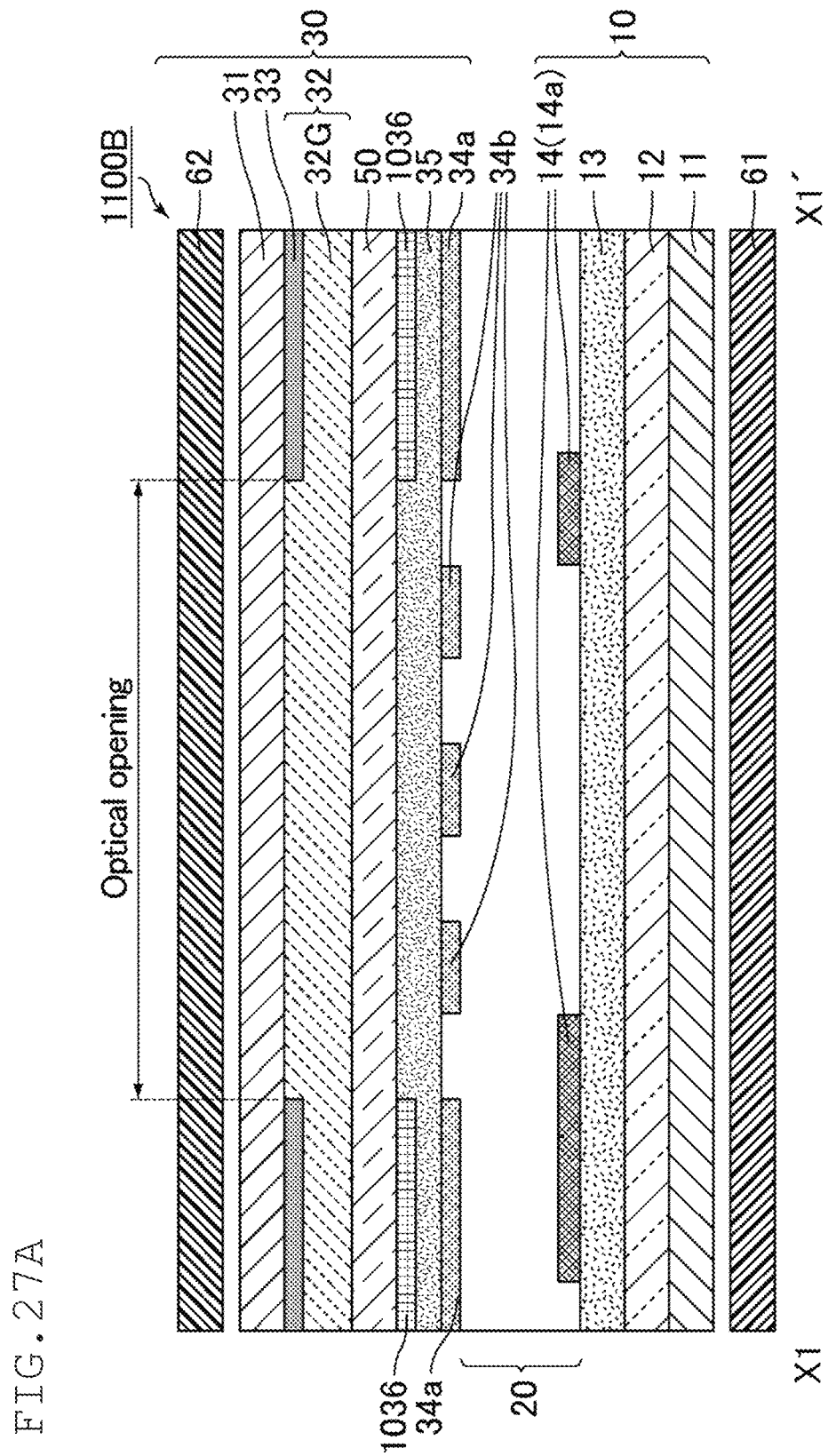
FIG. 27A is a schematic cross-sectional view of a liquid crystal panel of Comparative Example 2.
Figure 27B:
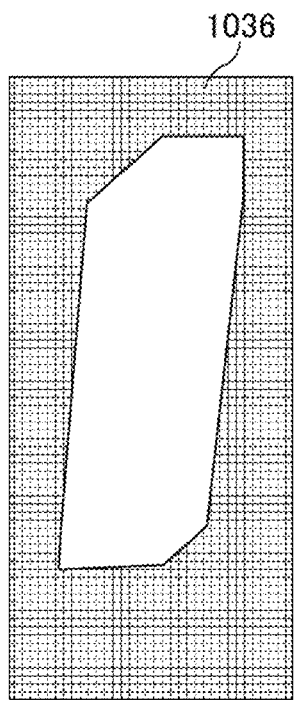
FIG. 27B is a schematic plan view of the third electrode in FIG. 27A.

FIG. 27A is a schematic cross-sectional view of a liquid crystal panel of Comparative Example 2. FIG. 27B is a schematic plan view of the third electrode in FIG. 27A. A liquid crystal panel 1100B of Comparative Example 2 has the same configuration as in Example 5, except for the shape of an electrode 1036 disposed between the black matrix 33 and the third electrode 34 (34a, 34b). The fourth electrode 36 in Example 5 was a solid electrode with no opening as shown in FIG. 5B. Meanwhile, the electrode 1036 in Comparative Example 2 is different from the fourth electrode 36 in that it had the same planar shape as the black matrix 33 as shown in FIG. 27B.

In Examples 1, 4, and 5 and Comparative Example 2, black display in the privacy mode was provided by setting the common voltage Vcom applied to the first electrode, the second electrodes, and the fourth electrode to 0 V, and setting the counter voltage to 10 V (alternating voltage). Also, white display in the privacy mode was provided by setting the voltage applied to the first electrode to 6.5 V (alternating voltage), the voltage applied to the second electrodes and the fourth electrode to 0 V, and the counter voltage to 10 V (alternating voltage).

Figure 28:
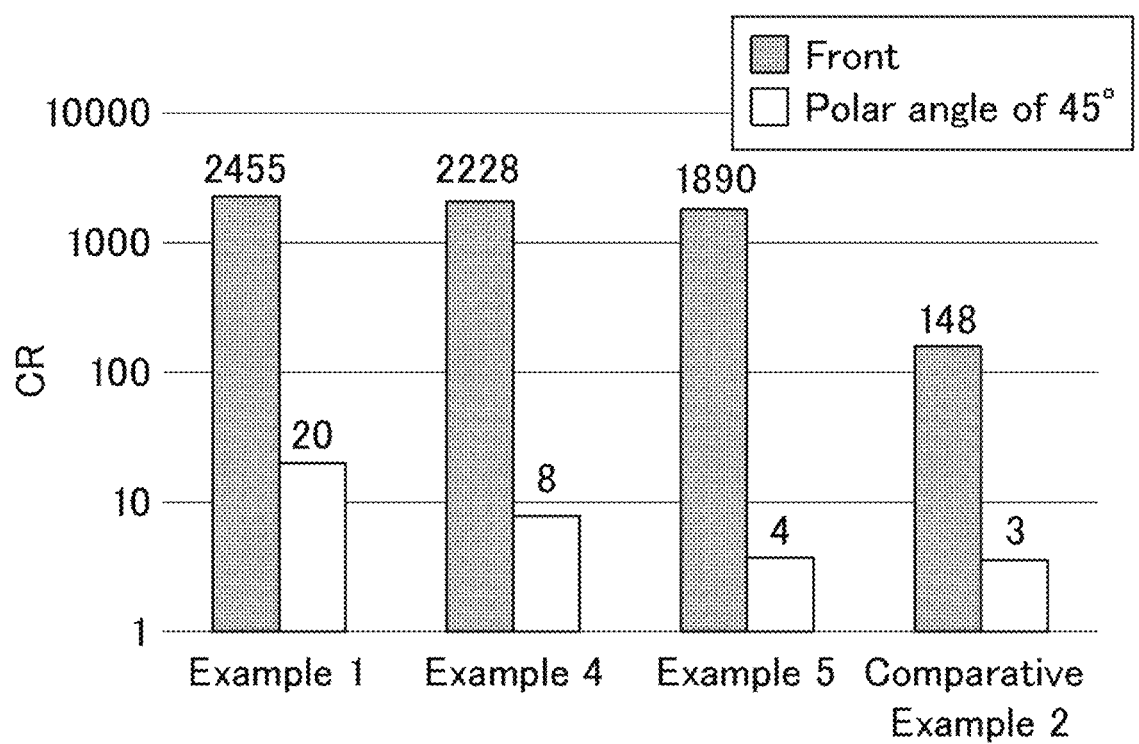
FIG. 28 is a graph comparing the contrast ratios in Examples 1, 4, 5, and Comparative Example 2.

FIG. 28 is a graph comparing the contrast ratios in Examples 1, 4, and 5, and Comparative Example 2. As shown in FIG. 28, in each of Examples 1, 4, and 5, a high front contrast ratio was achieved. An increase in the contrast ratio at a polar angle of 45° was successfully reduced relative to the front contrast ratio, so that the privacy mode was achieved. Also, in the order of Example 1 with no third linear electrode, Example 4 with one third linear electrode, and Example 5 with three third linear electrodes, the contrast ratio at a polar angle of 45° decreased. In the order of Example 1, Example 4, and Example 5, the privacy was more enhanced.

In contrast, in Comparative Example 2, when the counter voltage was 10 V, the front contrast ratio was lower than in Examples 1, 4, and 5. This is presumably because in Comparative Example 2, the electrode 1036 corresponding to the fourth electrode failed to achieve a sufficient shield effect and thus caused charging of the black matrix, so that light leakage occurred in black display in the privacy mode and decreased the front contrast ratio.

REFERENCE SIGNS LIST

1: gate line
2: source line
3: TFT
10: active matrix substrate
11: first substrate
12: first electrode
13: first insulating layer
14: second electrode
14a: first linear electrode
14b: opening
20: liquid crystal layer
30: color filter substrate
31: second substrate
32: color filter
32B: blue color filter
32G: green color filter
32R: red color filter
33: black matrix
34: third electrode
34a: second linear electrode
34b: third linear electrode
35: second dielectric layer
36: fourth electrode
36a: opening
50: first dielectric layer
51: third dielectric layer
61: first polarizing plate
61A: absorption axis of first polarizing plate
62: second polarizing plate
62A: absorption axis of second polarizing plate
70: sub-pixel (first sub-pixel)
70B: first blue sub-pixel
70G: first green sub-pixel
70R: first red sub-pixel
71: second sub-pixel
71B: second blue sub-pixel
71G: second green sub-pixel
71R: second red sub-pixel
72: display unit
72B: blue display unit
72G: green display unit
72R: red display unit
73: color element
100A, 100B, 100C, 100D, 100E, 100F, 100G, 100H, 1100A, 1100B: liquid crystal panel
101: first electrode drive circuit
102: second electrode drive circuit
103: third electrode drive circuit
200: control circuit
201: image signal synthesis circuit
202: display mode selection circuit
203: third electrode application voltage switching circuit
204: luminance modulation circuit 205: database
211: raw image signal
212: image signal
213: display mode switching signal
214: first display mode selection signal
215: second display mode selection signal
216: driving voltage signal
217: constant voltage signal
218: luminance modulation signal
219: veil-view display switching signal
220: veil-view pattern image signal
300: backlight
301: backlight drive circuit
310: light guide plate
311: light source
312: shading louver
312a: light transmitting layer
312b: light absorbing layer
313: reflection sheet
314: prism sheet
315: diffusion sheet

What is claimed is:

1. A liquid crystal display panel comprising:
a liquid crystal panel provided with sub-pixels arranged in a matrix pattern; and
a control circuit,
the liquid crystal panel sequentially including an active matrix substrate, a liquid crystal layer, and a color filter substrate,
the active matrix substrate sequentially including a first substrate, a first electrode, a first insulating layer, and second electrodes arranged in each of the sub-pixels, and the second electrodes including a first linear electrode extending in a first direction,
the active matrix substrate further including gate lines and source lines intersecting the gate lines in a plan view,
the color filter substrate including a second substrate, a black matrix arranged between the sub-pixels, a color filter layer, a third electrode, and a fourth electrode, the fourth electrode disposed between the black matrix and the third electrode, and a constant voltage applied to the fourth electrode,
the third electrode, which is formed from a transparent conductive material, including second linear electrodes extending in a second direction that intersects the first direction, the third electrode overlapping a portion of the black matrix in the plan view,
at least a part of one of the second linear electrodes overlapping one of the gate lines in the plan view and the one of the second linear electrodes intersecting the source lines in the plan view,
an angle formed by the first direction and the second direction being 800 or greater and 1000 or smaller,
the gate lines extending in the second direction, and
the control circuit configured to switch between applying a driving voltage and applying a constant voltage to the third electrode,
wherein in the plan view, the third electrode further includes a third linear electrode extending in the second direction and overlapping an optical opening in one of the sub-pixels, and the fourth electrode is provided with an opening positioned to overlap the third linear electrode in the plan view and extends in the second direction.

2. The liquid crystal display device according to claim 1, wherein the fourth electrode overlaps the third linear electrode in the optical opening in the one of the sub-pixels.

3. The liquid crystal display device according to claim 1, wherein the color filter substrate sequentially includes the second substrate, the black matrix, the color filter layer, a first dielectric layer, the fourth electrode, a second dielectric layer, and the third electrode.

4. The liquid crystal display device according to claim 3, further comprising:
a third dielectric layer between the third electrode and the liquid crystal layer.

5. The liquid crystal display device according to claim 1, wherein the color filter substrate sequentially includes the second substrate, the black matrix, the fourth electrode, the color filter layer, a second dielectric layer, and the third electrode.

6. The liquid crystal display device according to claim 1, wherein the control circuit is capable of switching between a first display mode and a second display mode, the first display mode allowing a first image to be observed in a narrow viewing angle range including a direction normal to the liquid crystal panel, the second display mode allowing the first image to be observed in a wide viewing angle range including the narrow viewing angle range, and
the control circuit is further configured to apply the driving voltage to the third electrode in the first display mode and apply the constant voltage to the third electrode in the second display mode.

7. The liquid crystal display device according to claim 6, further comprising:
a backlight behind a back surface of the liquid crystal panel, wherein
the backlight includes a light source and a shading louver disposed closer than the light source to the liquid crystal panel, and
the control circuit is further configured to control a luminance of the backlight to be lower in the first display mode than in the second display mode.

8. The liquid crystal display device according to claim 1, wherein with a direction perpendicular to the second direction in the plan view being defined as a perpendicular direction,
in the plan view, an edge of the one of the second linear electrodes on one side in the perpendicular direction is positioned closer than an edge of the one of the gate lines on the one side in the perpendicular direction to the one side, and
in the plan view, an edge of the one of the second linear electrodes on another side in the perpendicular direction is positioned closer than an edge of the one of the gate lines on the other side in the perpendicular direction to the other side.

9. The liquid crystal display device according to claim 1, wherein the opening in the fourth electrode is surrounded by an electrode portion of the fourth electrode.

10. The liquid crystal display device according to claim 9, wherein a shape of the opening in the fourth electrode is a rectangle in the plan view.

11. The liquid crystal display device according to claim 1, wherein the third electrode further includes a plurality of third linear electrodes, including the third linear electrode and another third linear electrode extending in the second direction, disposed in the one of the sub-pixels, the fourth electrode is provided, in the one of the subpixels, with a same number of openings as a number of the plurality of third linear electrodes, each of the openings is positioned to overlap a corresponding third linear electrode in the plan view.

12. The liquid crystal display device according to claim 1, wherein an area of the fourth electrode is greater than an area of the black matrix.

* * * * *